(12) United States Patent
Knutson et al.

(10) Patent No.: US 11,148,373 B2
(45) Date of Patent: *Oct. 19, 2021

(54) SYSTEM AND METHOD FOR LAYING UP A COMPOSITE LAMINATE HAVING INTEGRALLY LAMINATED FILLER ELEMENTS

(71) Applicant: The Boeing Company, Chicago, IL (US)

(72) Inventors: Samuel J. Knutson, Charleston, SC (US); Raviendra S. Suriyaarachchi, Daniel Island, SC (US); Carla G. Smith, Summerville, SC (US); Luis F. Velasquez, Charleston, SC (US)

(73) Assignee: The Boeing Company, Chicago, IL (US)

( * ) Notice: Subject to any disclaimer, the term of this patent is extended or adjusted under 35 U.S.C. 154(b) by 114 days.

This patent is subject to a terminal disclaimer.

(21) Appl. No.: 16/459,345

(22) Filed: Jul. 1, 2019

(65) Prior Publication Data

US 2021/0001573 A1    Jan. 7, 2021

(51) Int. Cl.
*B29C 70/38* (2006.01)
*B29C 70/54* (2006.01)
(Continued)

(52) U.S. Cl.
CPC .... *B29C 70/388* (2013.01); *B29K 2105/0872* (2013.01); *B29L 2031/3076* (2013.01); *B32B 38/0004* (2013.01); *Y10T 156/10* (2015.01)

(58) Field of Classification Search
CPC ... B29C 70/382; B29C 70/284; B29C 70/388; B29C 70/545; B32B 38/0004; Y10T 156/10
See application file for complete search history.

(56) References Cited

U.S. PATENT DOCUMENTS

| 7,137,182 B2 | 11/2006 | Nelson |
| 7,527,222 B2 | 5/2009 | Biornstad |

(Continued)

FOREIGN PATENT DOCUMENTS

| EP | 3377308 | 9/2018 |
| EP | 3378633 | 9/2018 |

OTHER PUBLICATIONS

EPO, European Search Report for appl. No. EP 20176459, dated Oct. 22, 2020.

*Primary Examiner* — Mark A Osele
*Assistant Examiner* — Christopher C Caillouet

(57) ABSTRACT

A manufacturing system for laying up a stringer laminate includes a lamination surface and a plurality of lamination heads including a frame filler outer ply lamination head for laying up (e.g., laminating) frame filler bottom ply at a plurality of frame filler locations. Also included is at least one frame filler inner ply lamination head for laying up one or more frame filler inner plies over a protruding portion of the frame filler bottom ply at each frame filler location. Further included is at least one stringer body lamination head laying up one or more stringer body plies defining a stringer body portion extending along the lamination surface. A frame filler outer ply lamination head is configured to lay up a frame filler top ply at each frame filler location such that the frame filler inner plies are captured between a frame filler bottom ply and a frame filler top ply.

21 Claims, 25 Drawing Sheets

(51) Int. Cl.
*B32B 38/00* (2006.01)
*B29K 105/08* (2006.01)
*B29L 31/30* (2006.01)

(56) References Cited

U.S. PATENT DOCUMENTS

| | | |
|---|---|---|
| 7,527,759 B2 | 5/2009 | Lee et al. |
| 7,655,168 B2 | 2/2010 | Jones et al. |
| 7,879,177 B2 | 2/2011 | McCowin et al. |
| 7,922,856 B2 | 4/2011 | Hagman et al. |
| 8,012,291 B2 | 9/2011 | Kisch et al. |
| 8,206,540 B2 | 6/2012 | Evans |
| 8,336,596 B2 * | 12/2012 | Nelson .................. B29C 70/202 |
| | | 156/574 |
| 8,465,613 B2 | 6/2013 | Rotter et al. |
| 8,640,757 B2 | 2/2014 | McCowin et al. |
| 8,758,538 B2 | 6/2014 | Borgmann et al. |
| 8,808,490 B2 | 8/2014 | Hagman et al. |
| 9,314,974 B2 | 4/2016 | Buttrick |
| 9,399,338 B1 | 7/2016 | Metschan |
| 2012/0227907 A1 | 9/2012 | Arakawa |
| 2018/0093432 A1 | 4/2018 | Kim |
| 2019/0224928 A1 * | 7/2019 | Danninger ............ B29C 70/386 |

* cited by examiner

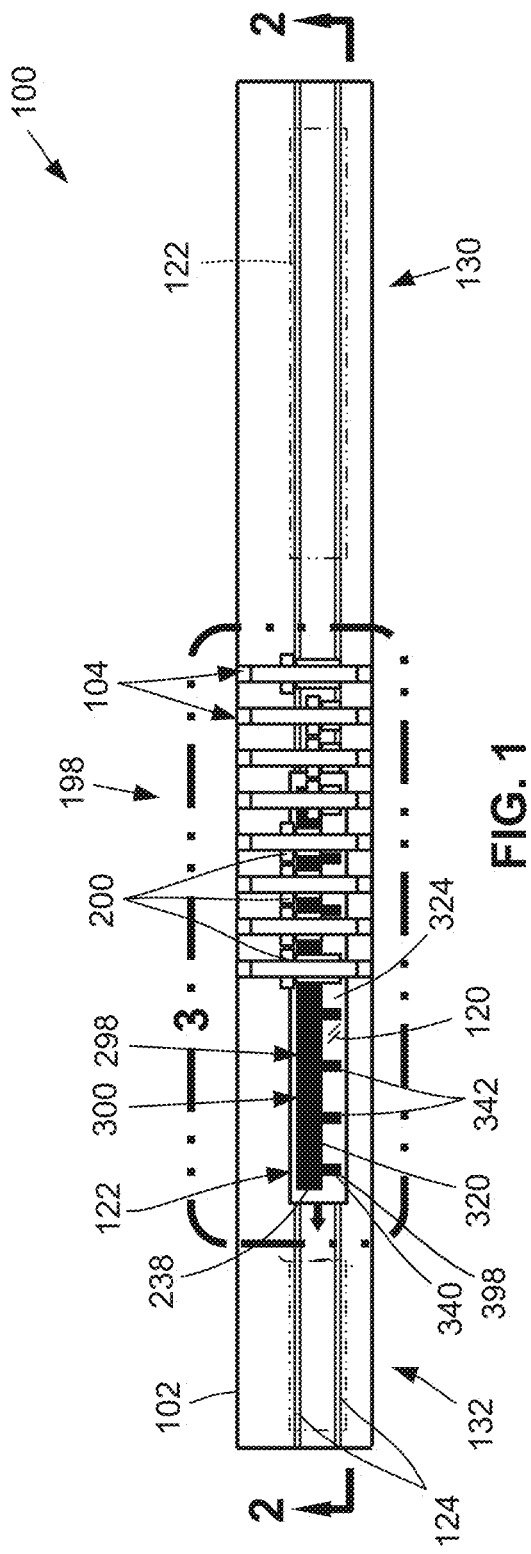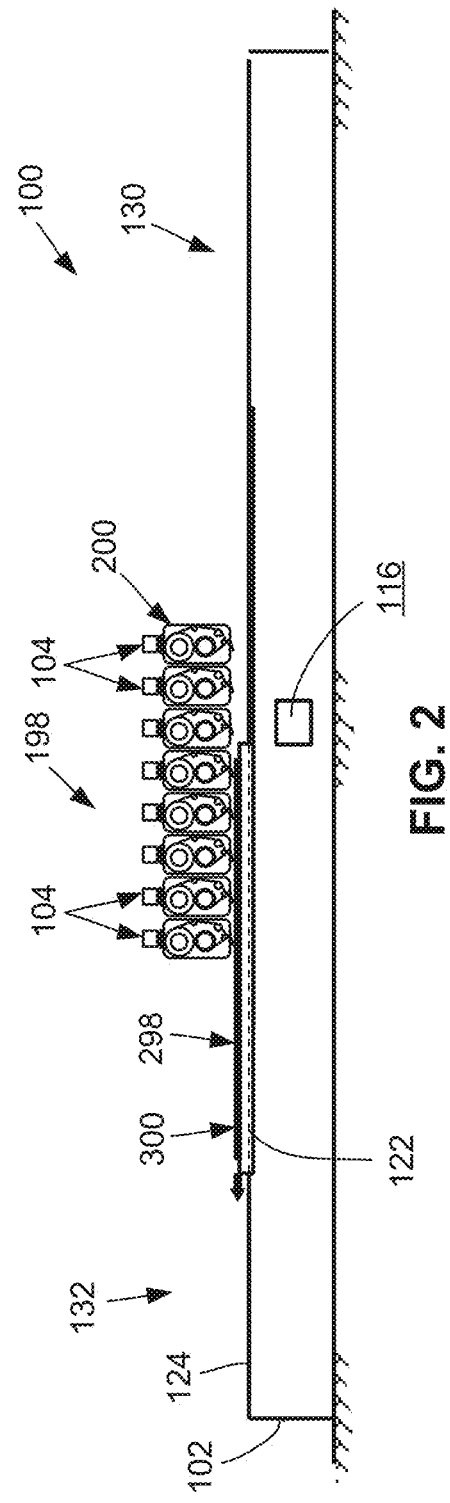

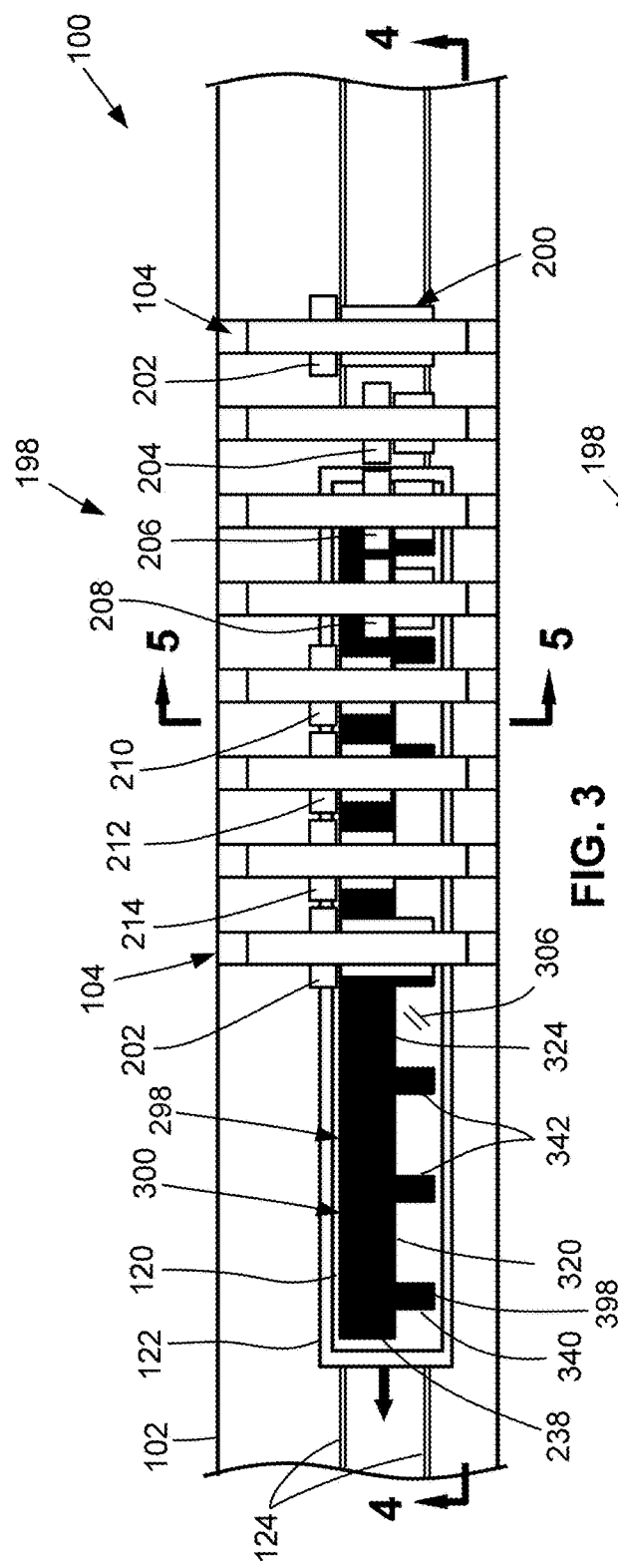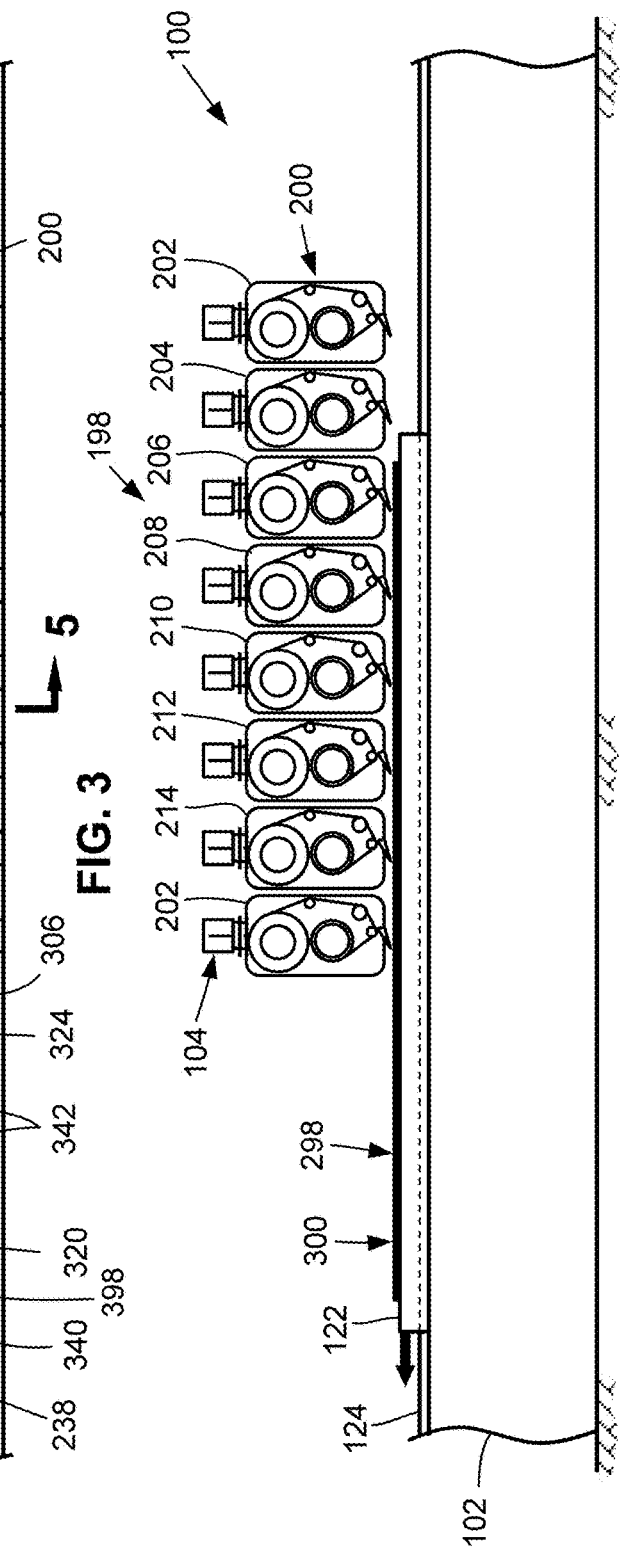

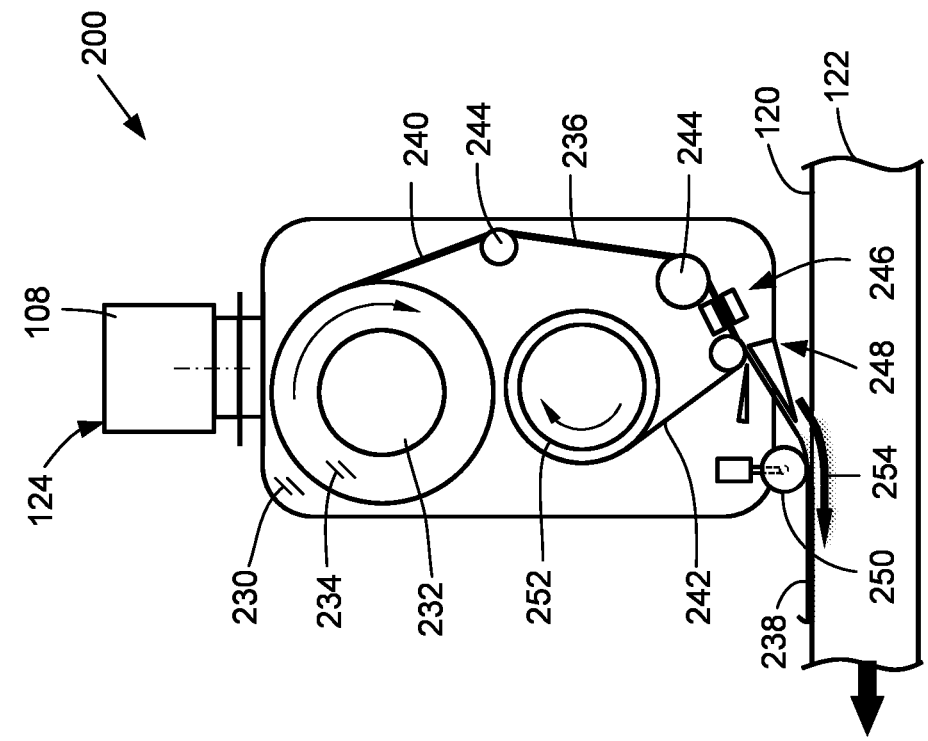
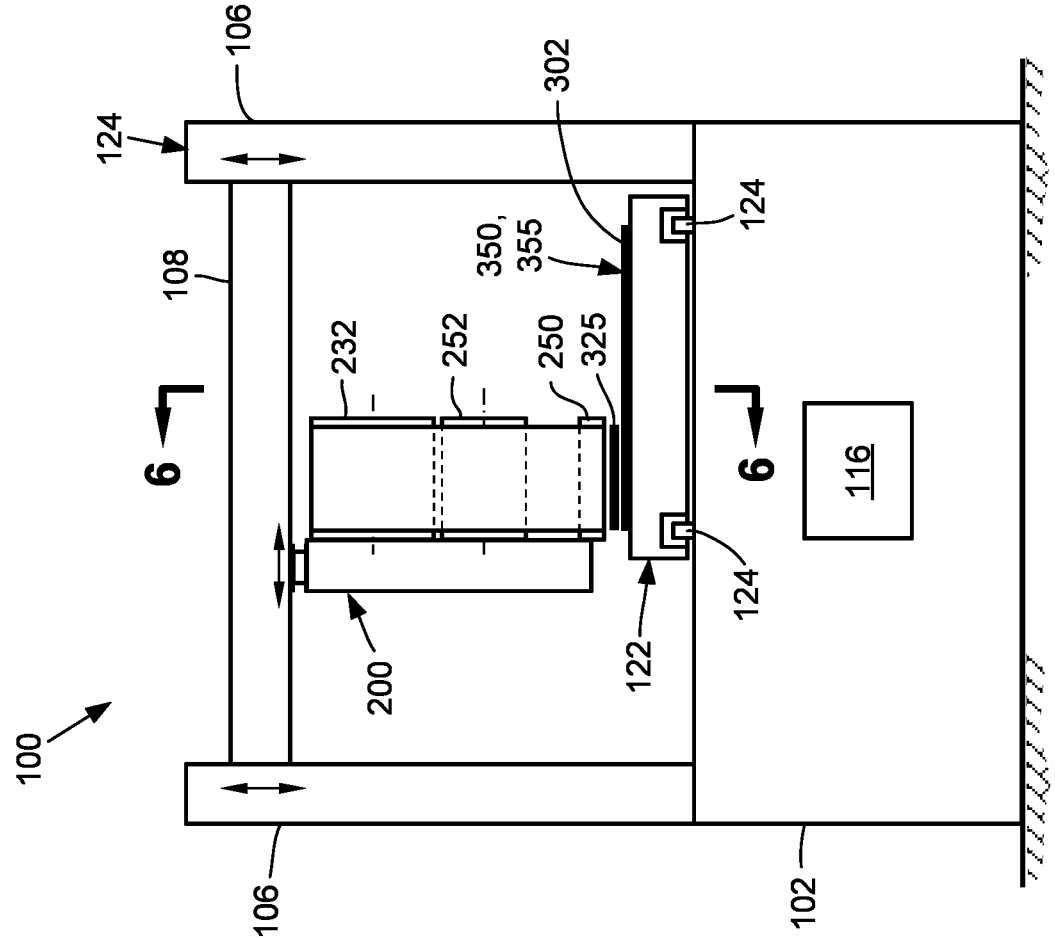

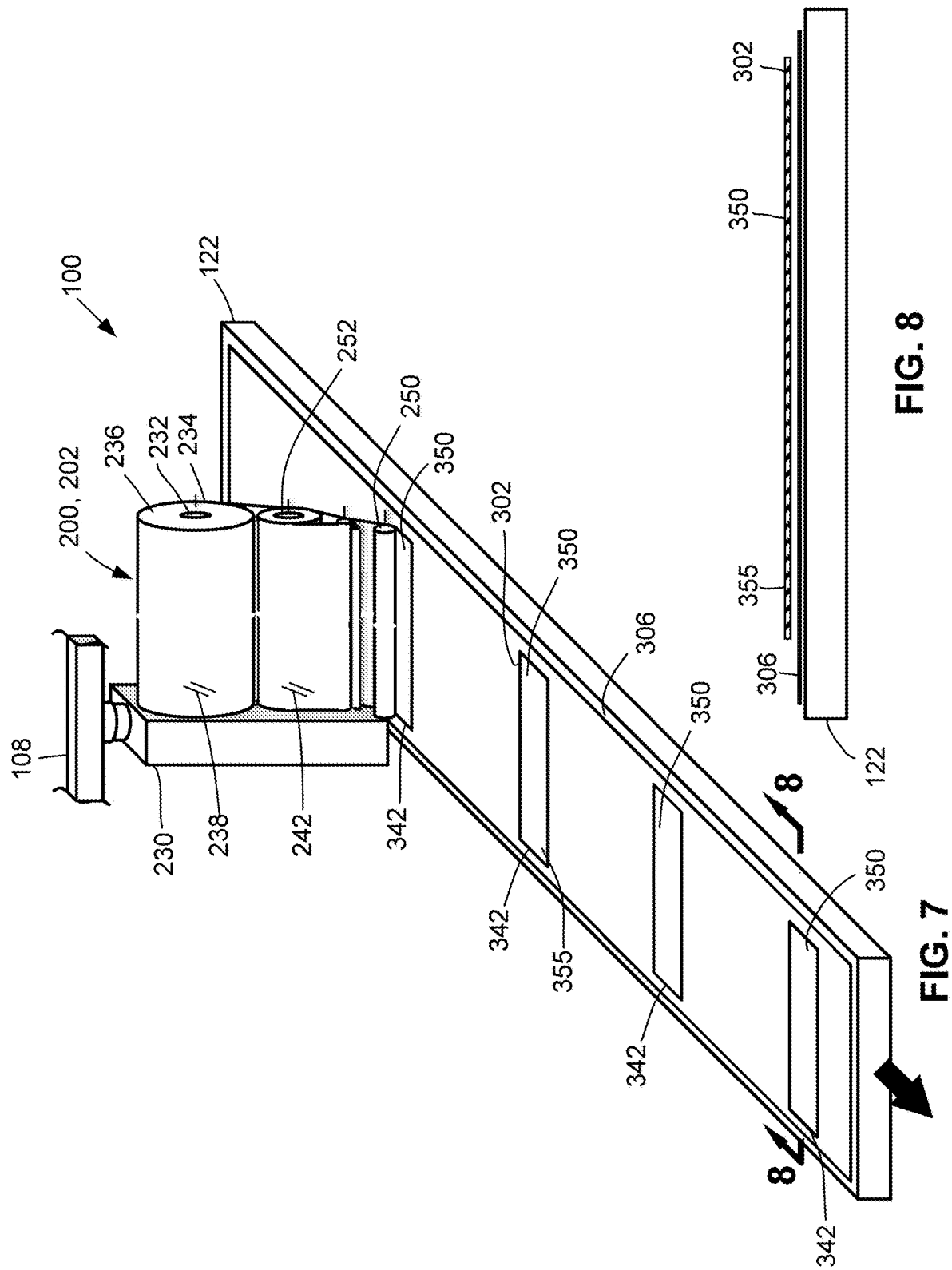

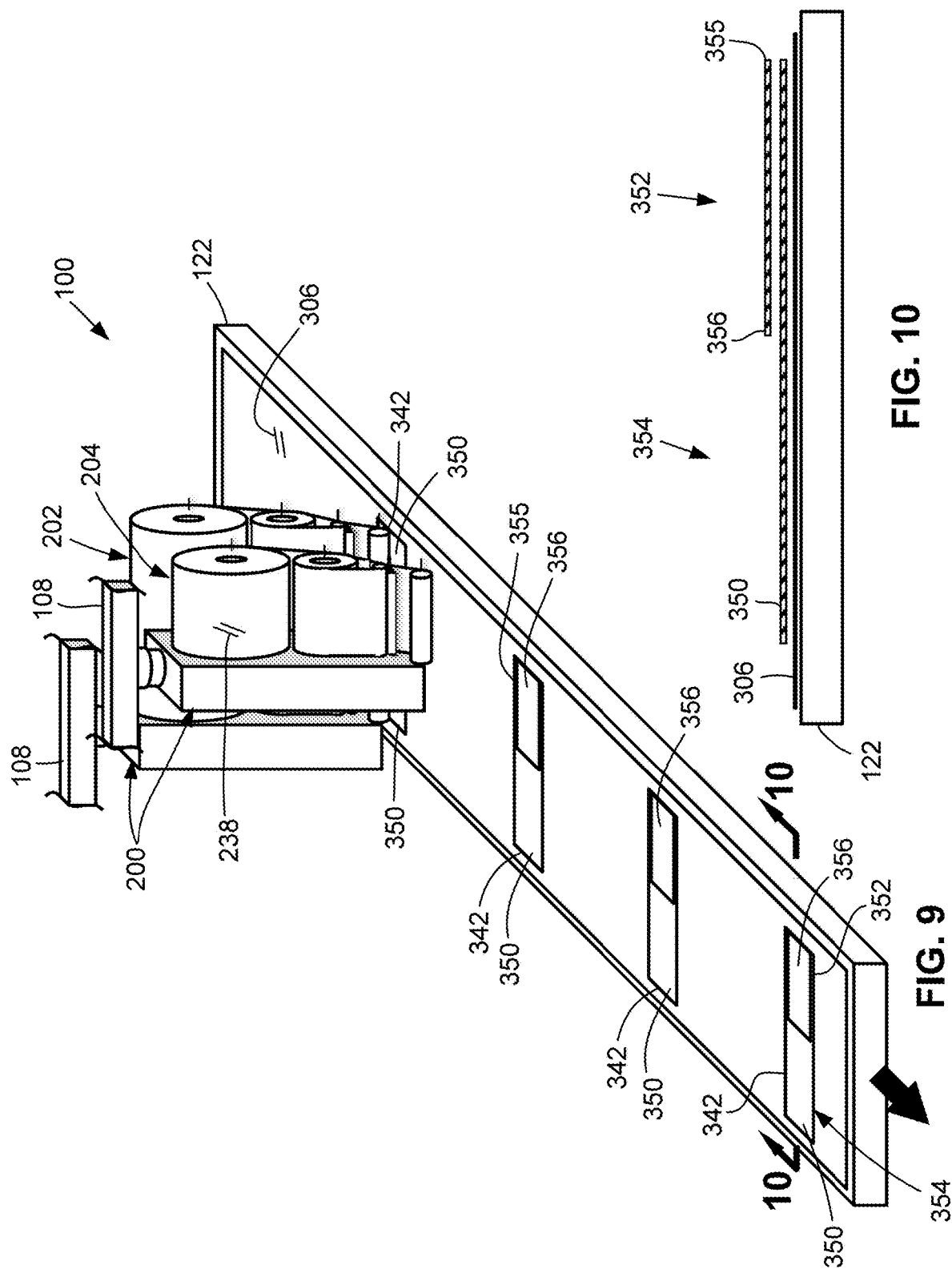

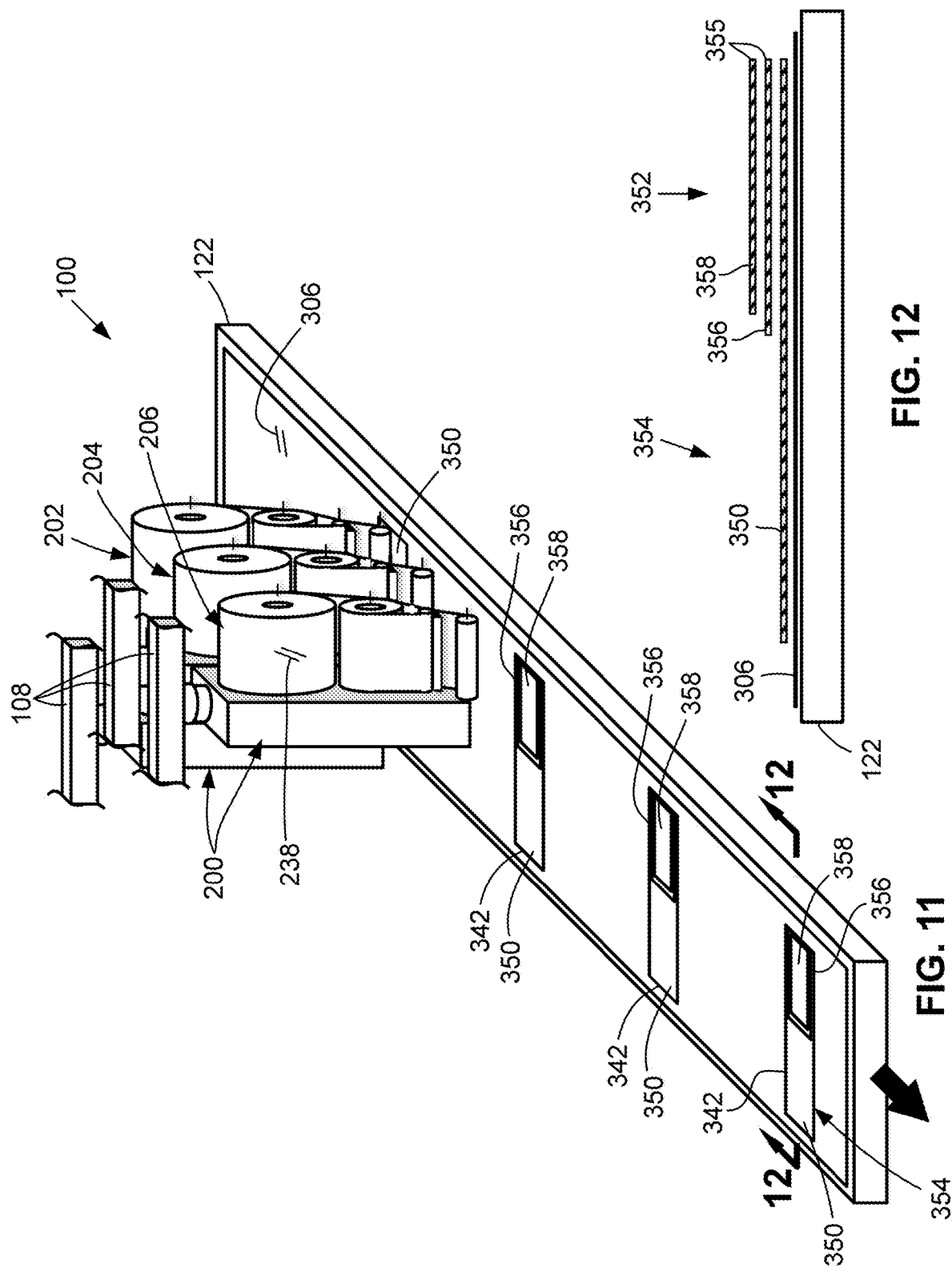

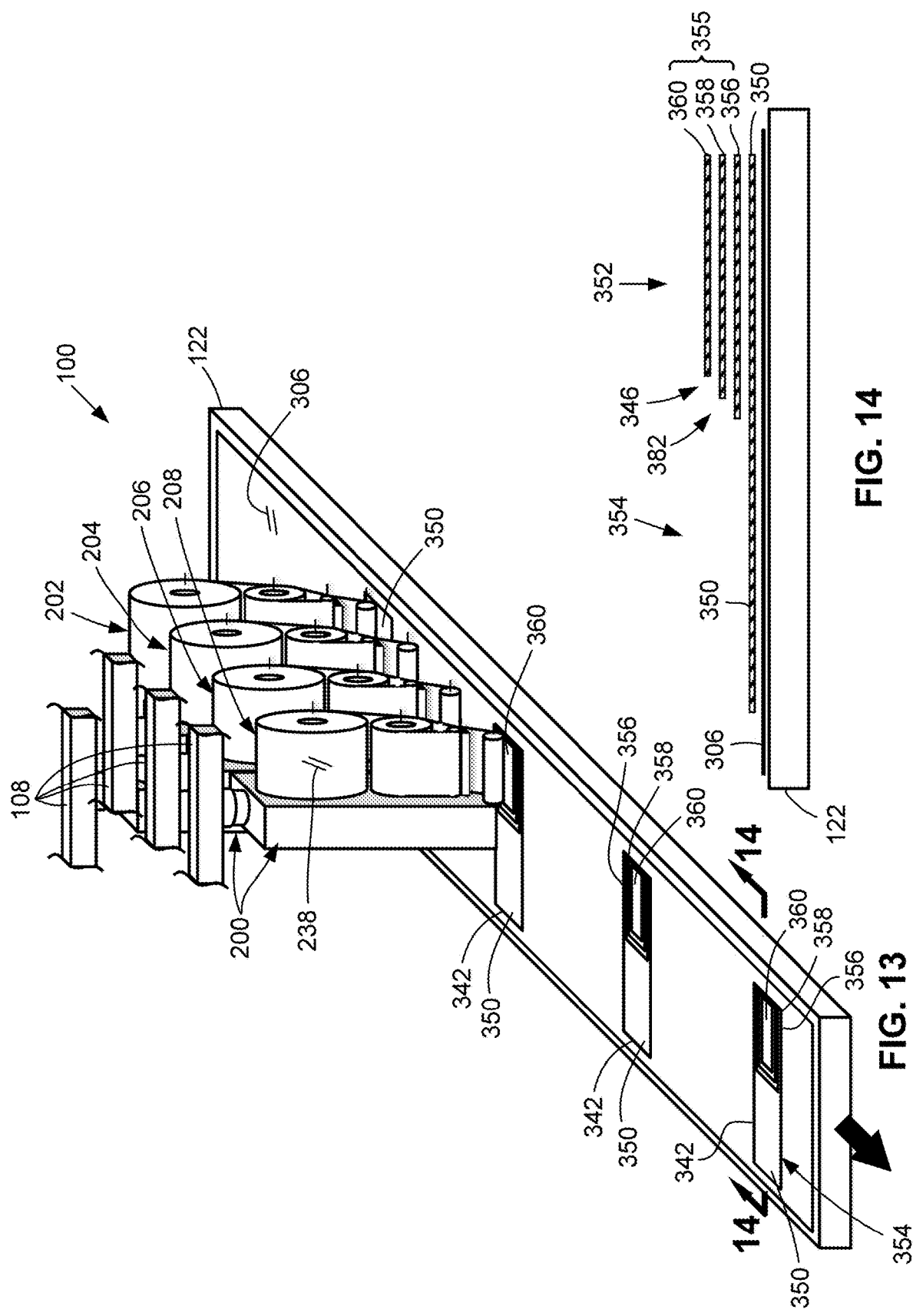

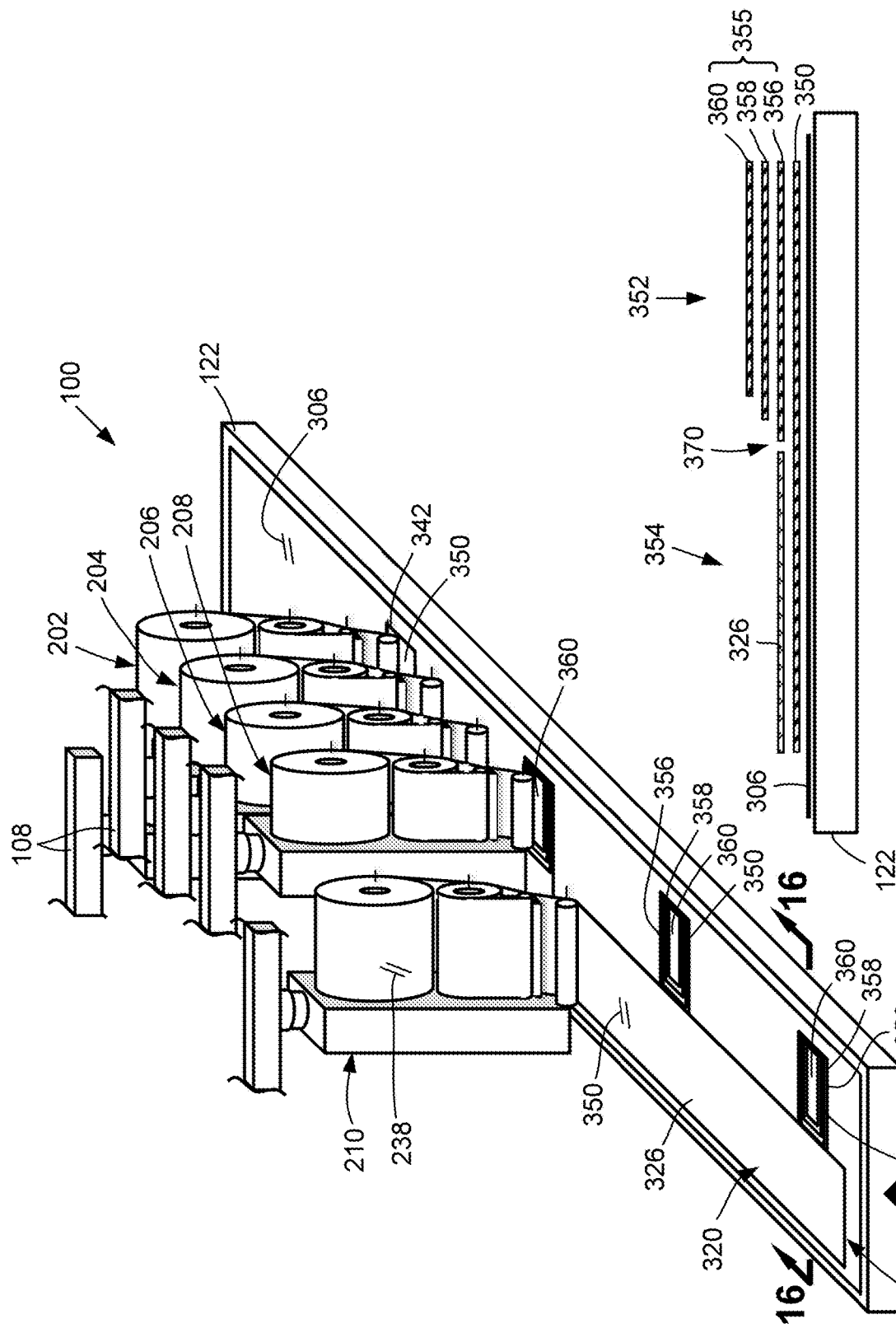

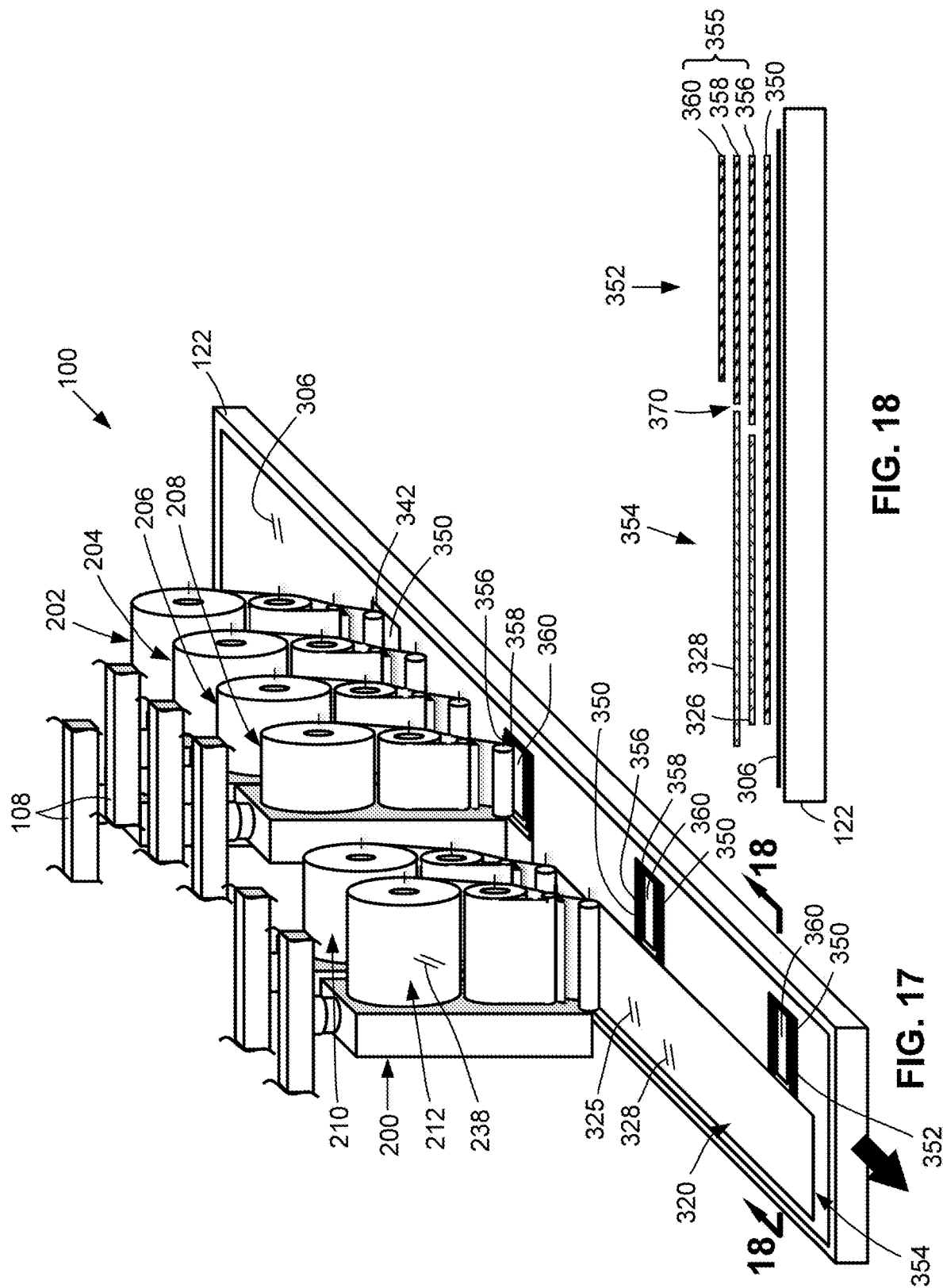

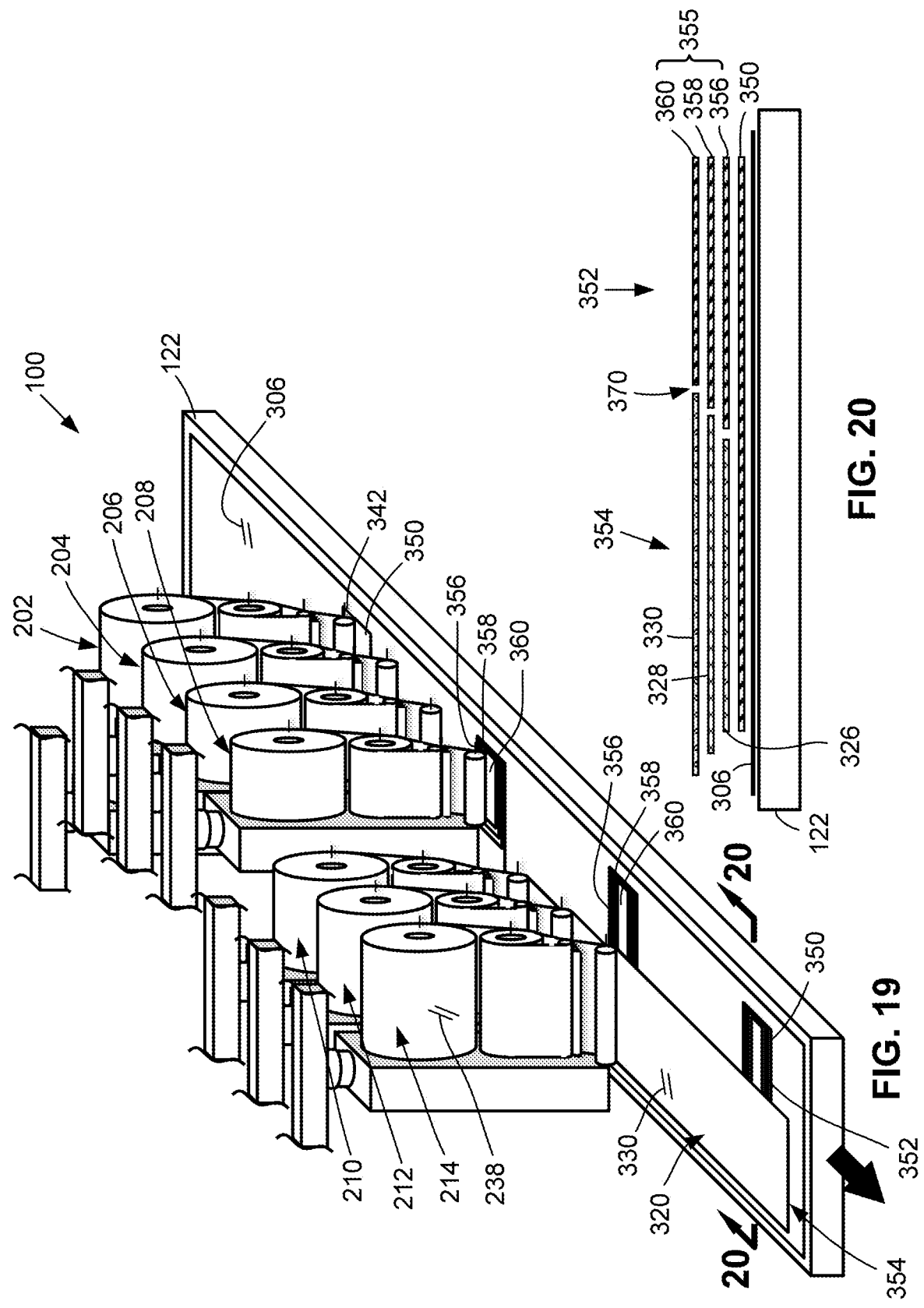

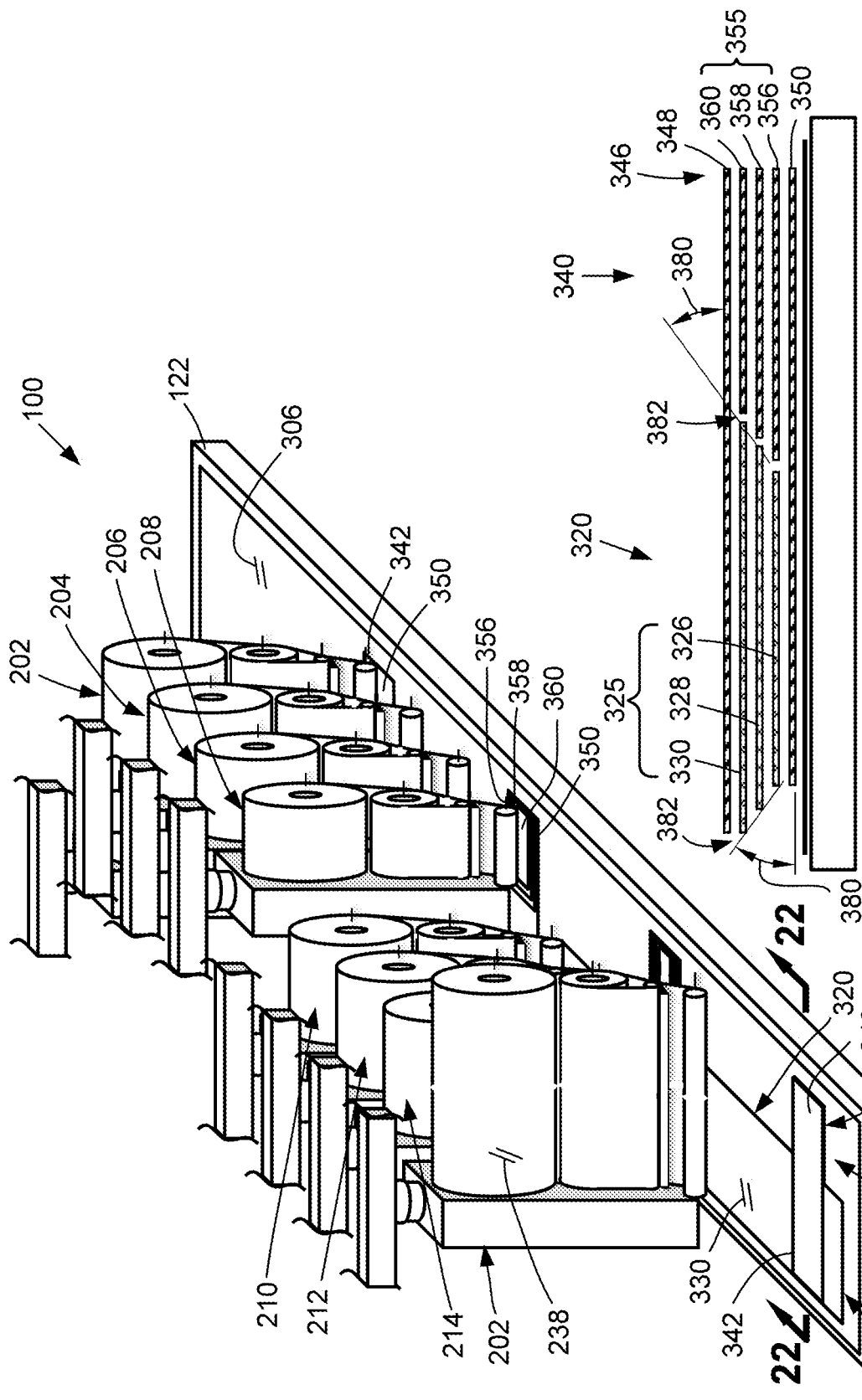

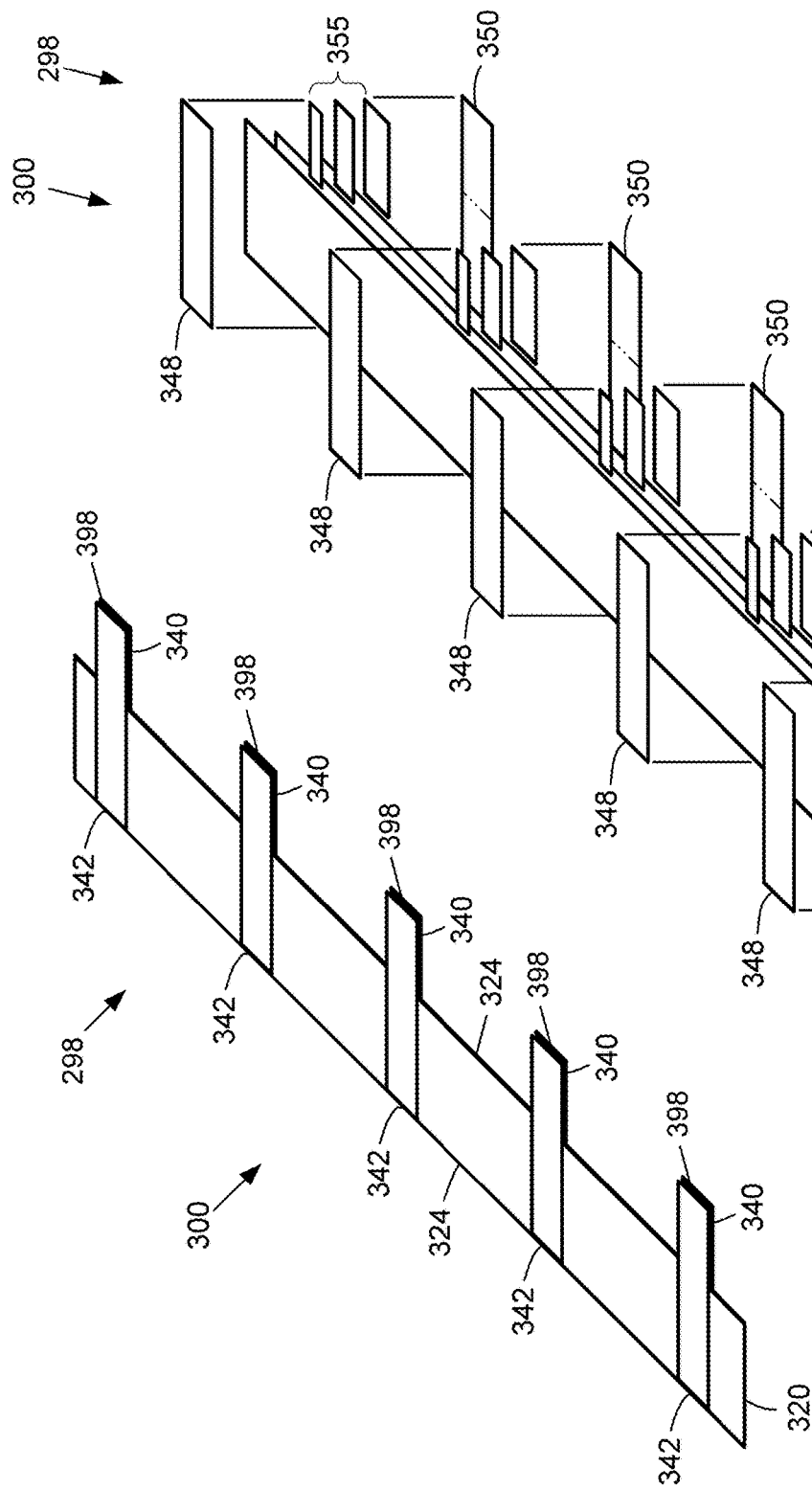
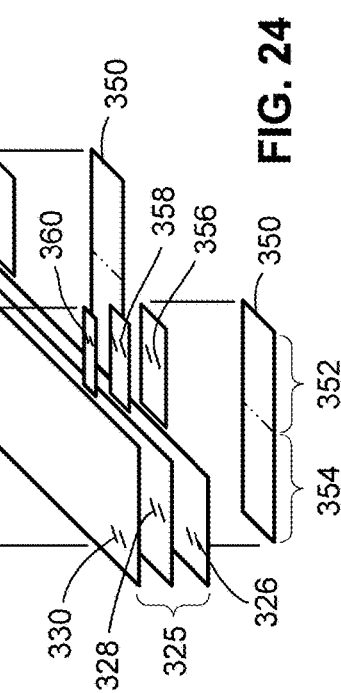
FIG. 23
FIG. 24

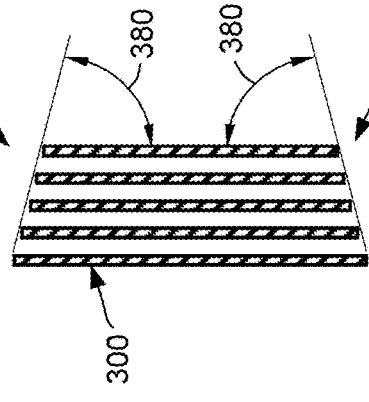
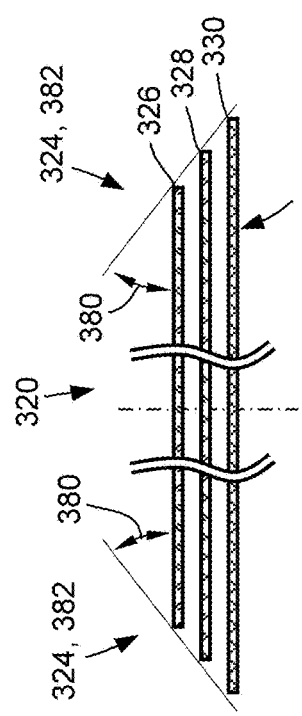
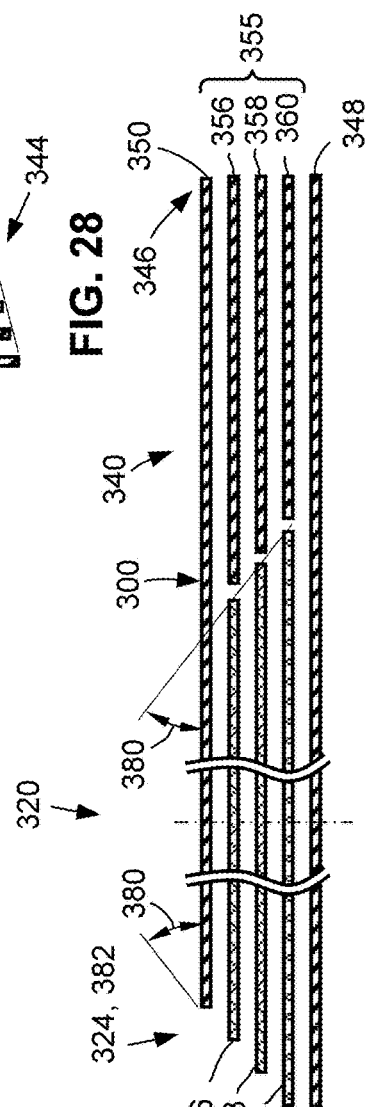
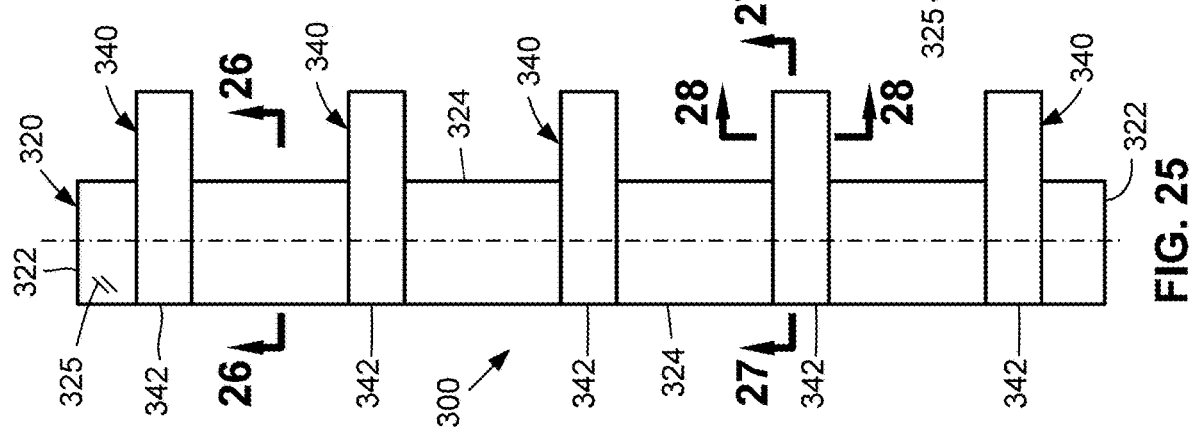

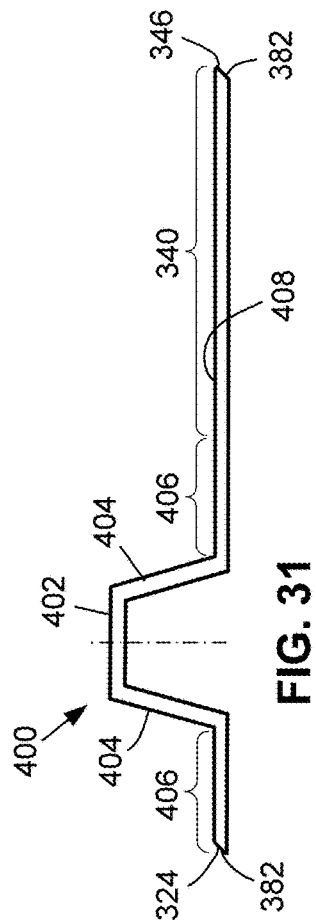
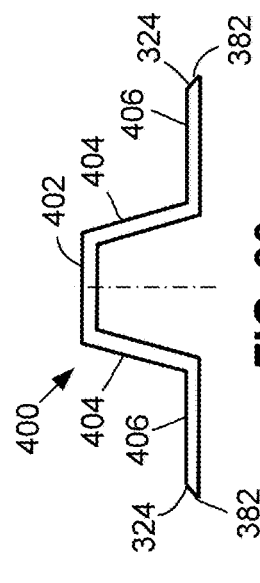
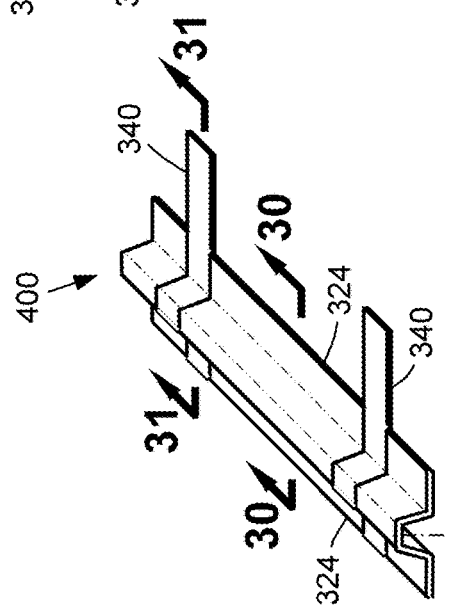
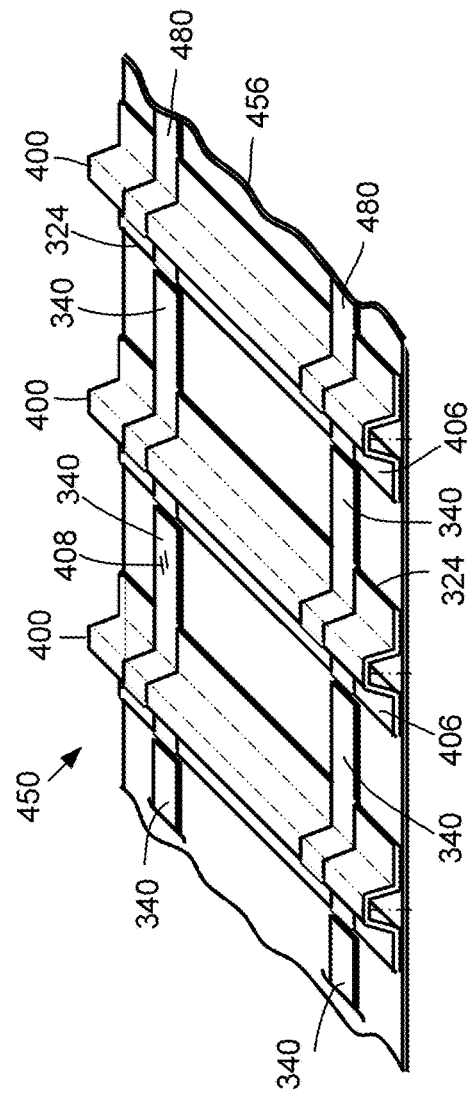

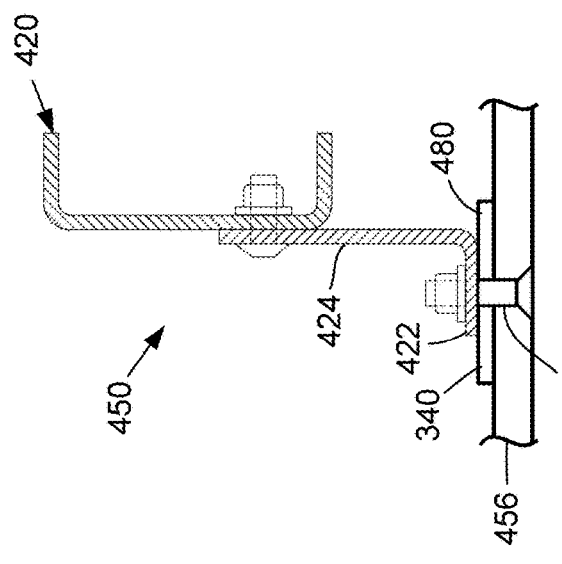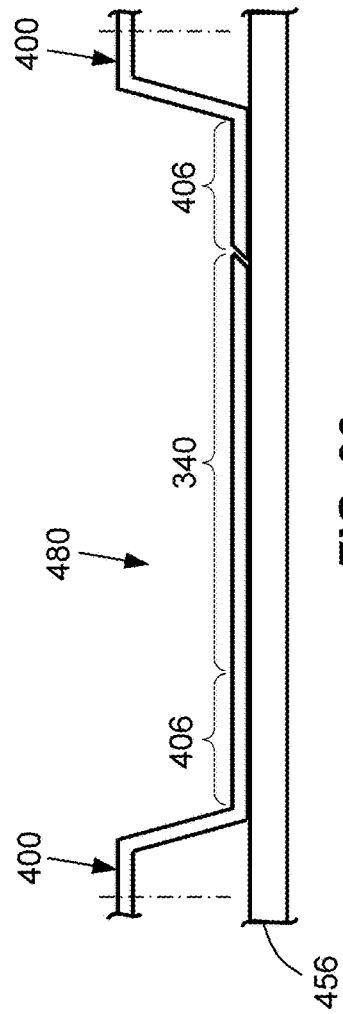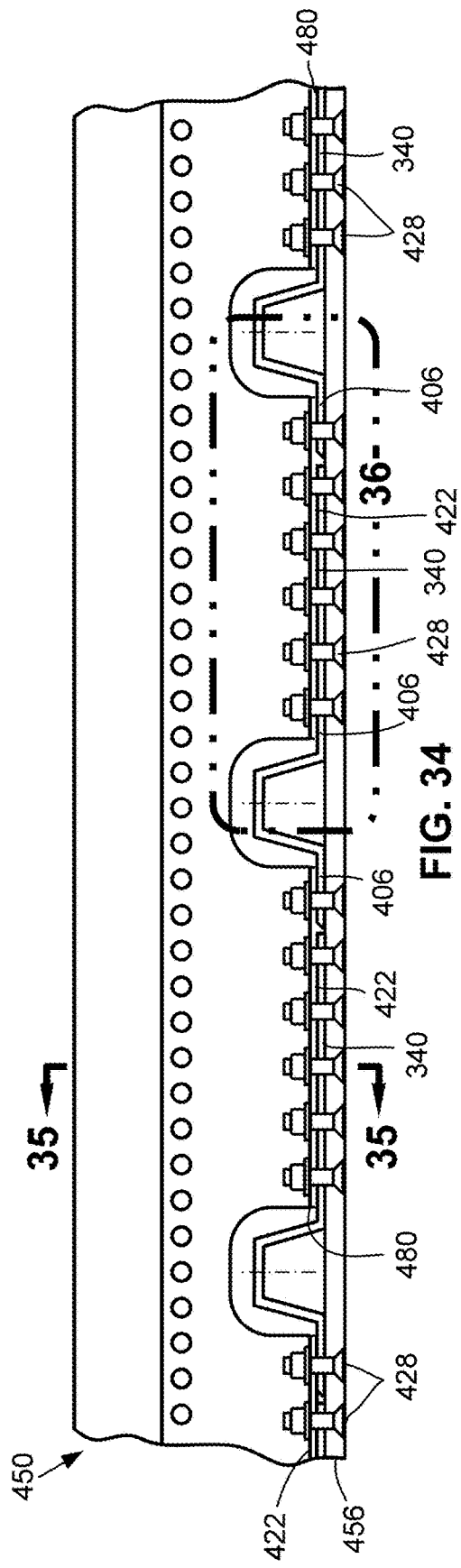

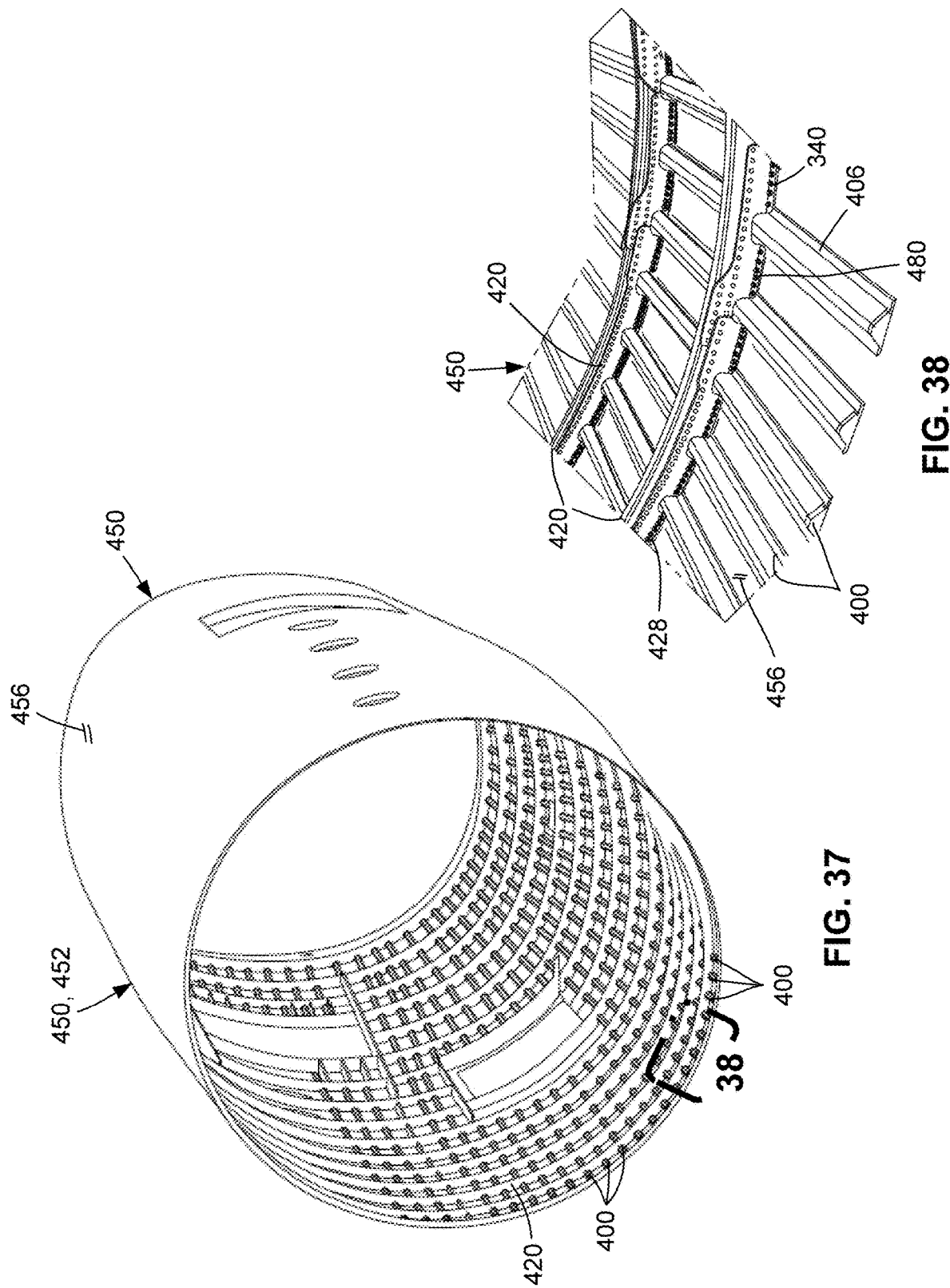

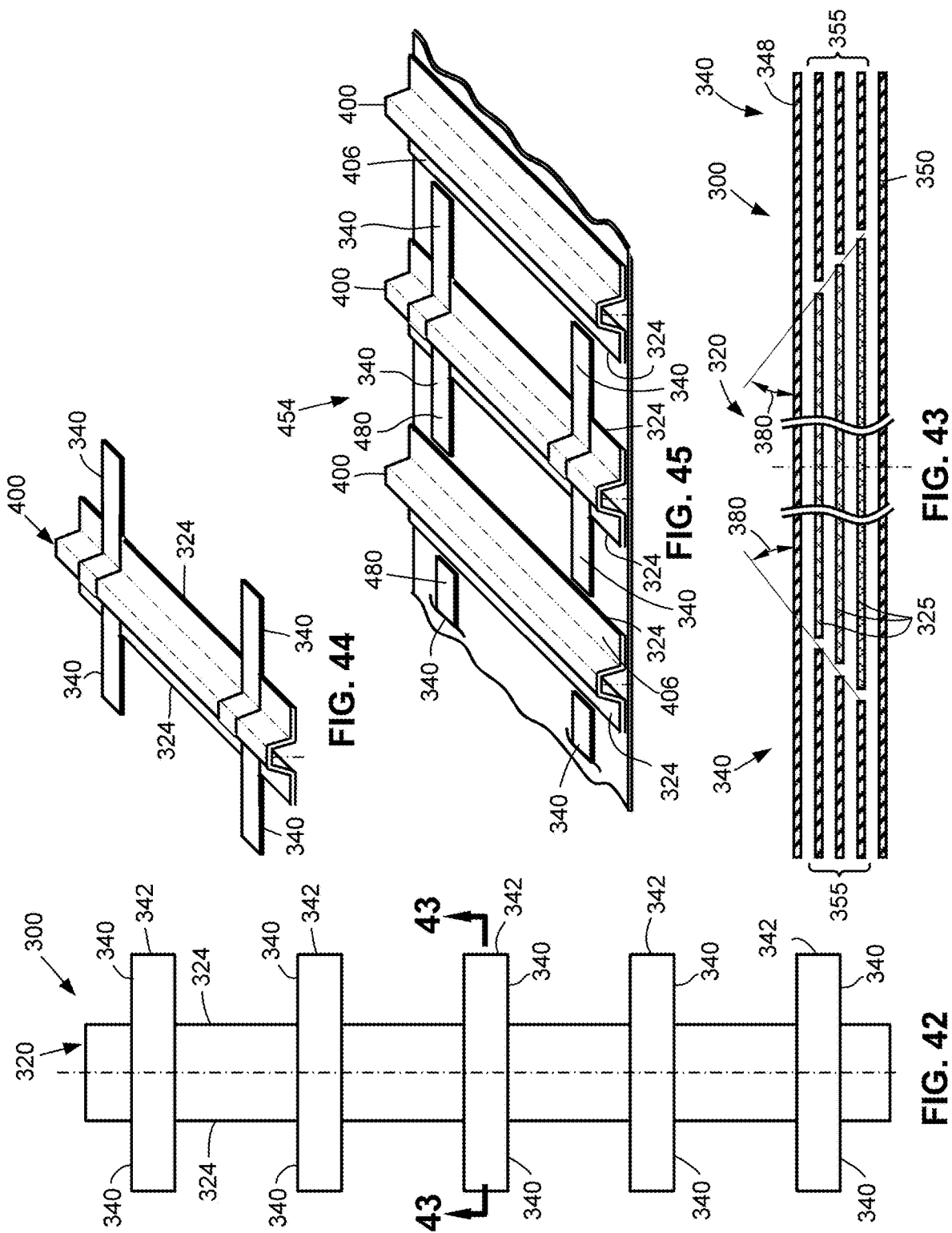

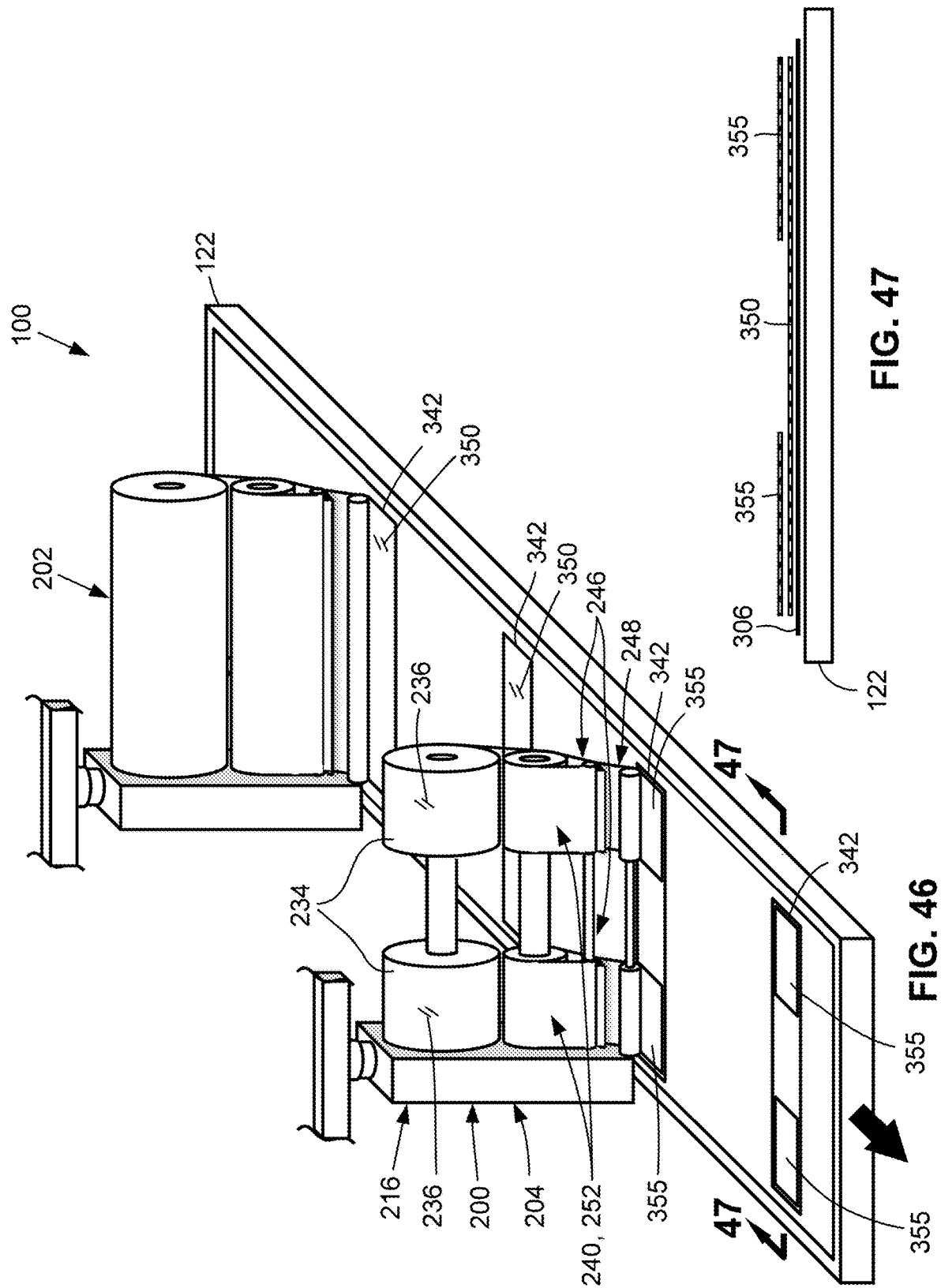

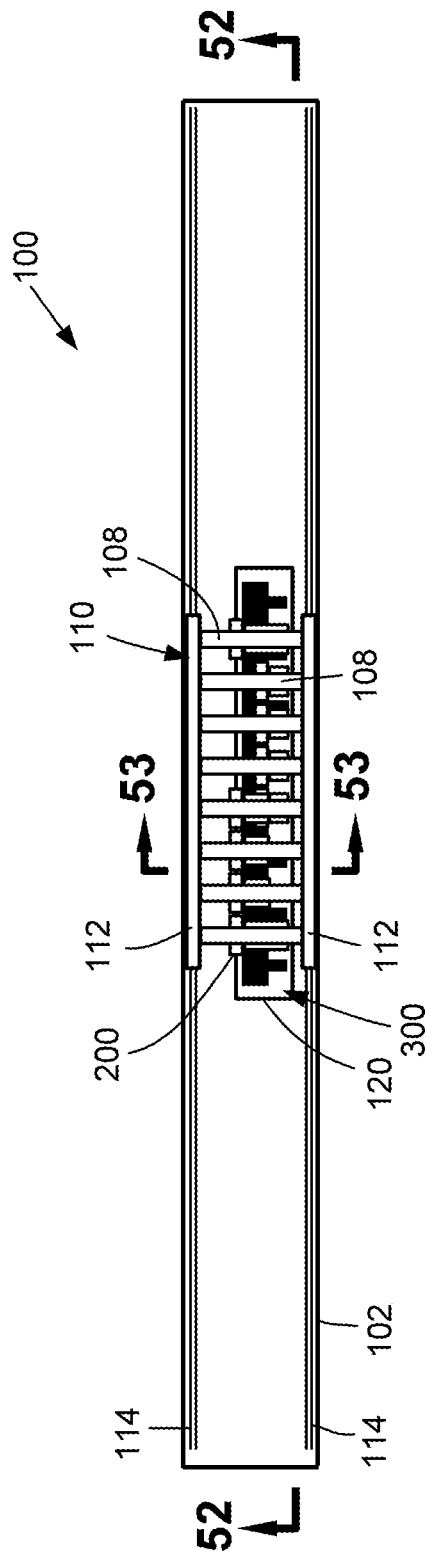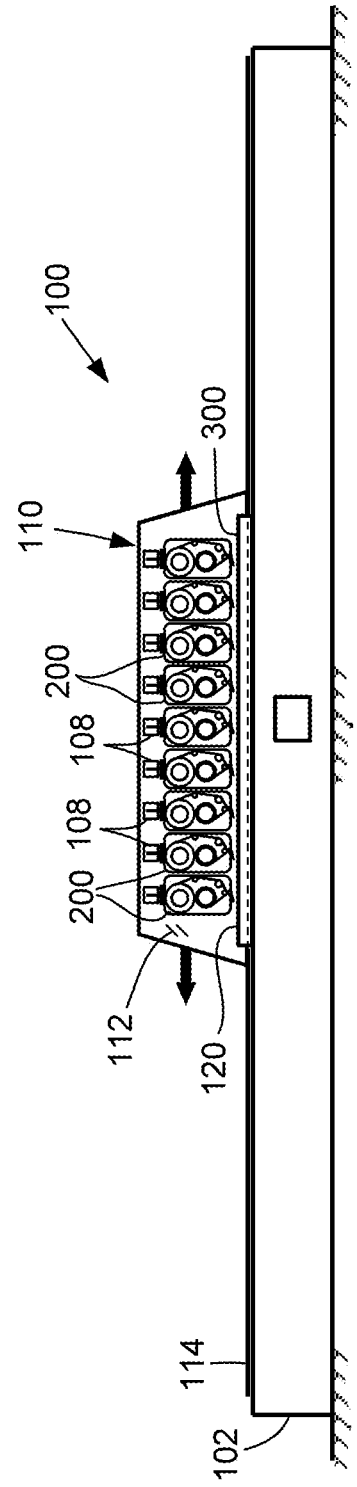

SYSTEM AND METHOD FOR LAYING UP A COMPOSITE LAMINATE HAVING INTEGRALLY LAMINATED FILLER ELEMENTS

FIELD

The present disclosure relates generally to composites manufacturing and, more particularly, to a system and method for manufacturing a composite laminate having integrally laminated filler elements.

BACKGROUND

Composite structures are used in a wide variety of applications due to their high strength-to-weight ratio, good corrosion resistance, and other favorable properties. In aircraft construction, composites are used in increasing quantities to produce the wings, the horizontal and vertical tail, the fuselage, and other components. For example, the fuselage of an aircraft may be manufactured by the end-to-end assembly of multiple composite barrel sections.

A fuselage barrel section may be fabricated by manufacturing a plurality of formed stringers. Each formed stringer may be manufactured by laying up and forming a composite laminate (e.g., a stringer laminate). A plurality of formed stringers may be mounted on a rotatable layup mandrel which may be overlaid with composite material to form a skin panel. The skin panel and the formed stringers may be co-cured or co-bonded, and mating structure such as circumferential frames may be mechanically fastened to the skin panel inside the barrel section. Gaps between the circumferential frames and the inner surface of the skin panel must be filled prior to installing the mechanical fasteners. Conventional methods for filling the gaps involve fabricating composite frame fillers and installing each frame filler in a labor-intensive and time-consuming process that significantly impacts the production rate.

As can be seen, there exists a need in the art for a system and method that avoids the time and expense associated with manually fabricating and installing individual frame fillers.

SUMMARY

The above-noted needs associated with manufacturing frame fillers are specifically addressed and alleviated by the present disclosure which provides a manufacturing system for laying up a stringer laminate. The manufacturing system includes a lamination surface. In addition, the manufacturing system includes a plurality of lamination heads configured to dispense composite material along a dispensing direction and laminate plies on the lamination surface and on previously-formed plies during relative movement between the lamination surface and the lamination heads along a direction generally aligned with the dispensing direction. The plurality of lamination heads include at least one frame filler outer ply lamination head configured to laminate a plurality of frame filler bottom plies at spaced intervals along the lamination surface to define a plurality of frame filler locations. In addition, the lamination heads include at least one frame filler inner ply lamination head configured to laminate one or more frame filler inner plies over a protruding portion of the frame filler bottom ply at each frame filler location such that an overlapping portion of each frame filler bottom ply is non-covered by the frame filler inner ply at each frame filler location. Furthermore, the lamination heads include at least one stringer body lamination head configured to laminate one or more stringer body plies defining a stringer body portion extending along the lamination surface and overlapping the overlapping portion at each frame filler location such that each stringer body ply is in side-by-side arrangement with a frame filler inner ply. Additionally, the lamination heads include the frame filler outer ply lamination head configured to laminate a frame filler top ply over the one or more frame filler inner plies at each frame filler location such that the one or more frame filler inner plies at each frame filler location are captured between a frame filler bottom ply and a frame filler top ply, and resulting in an uncured stringer laminate having a plurality of frame filler portions protruding laterally from the stringer body portion.

Also disclosed is a method of laying up a stringer laminate. The method includes laminating, using at least one frame filler outer ply lamination head, a plurality of frame filler bottom plies at spaced intervals along a lamination surface to define a plurality of frame filler locations. The method additionally includes laminating, using at least one frame filler inner ply lamination head, one or more frame filler inner plies over a protruding portion of each frame filler bottom ply and such that an overlapping portion of each frame filler bottom ply is non-covered by the frame filler inner ply at each frame filler location. The method also includes laminating, using at least one stringer body lamination head, one or more stringer body plies to define a stringer body portion extending along the lamination surface and overlapping the overlapping portion at each frame filler location such that each stringer body ply is in side-by-side arrangement with a frame filler inner ply. The method further includes laminating, using the frame filler outer ply lamination head, a frame filler top ply over the one or more frame filler inner plies at each frame filler location such that the one or more frame filler inner plies at each frame filler location are captured between a frame filler bottom ply and a frame filler top ply, and resulting in an uncured stringer laminate having a plurality of frame filler portions protruding laterally from the stringer body portion. In some examples, the above-described method may include laminating, using a frame filler external ply lamination head, at least one frame filler external ply over the lamination surface at one or more of a plurality of spaced-apart frame filler locations.

In addition, disclosed is a method of laying up a stringer laminate comprising laminating a plurality of frame filler bottom plies at spaced intervals along a lamination surface to define a plurality of frame filler locations. The method includes laminating at least one frame filler inner ply over a protruding portion of one or more of the frame filler bottom plies such that an overlapping portion of at least one of the frame filler bottom plies is non-covered by the frame filler inner ply. In addition, the method includes laminating at least one stringer body ply to define a stringer body portion extending along the lamination surface and overlapping the overlapping portion at one or more of the frame filler locations. The method further includes laminating a frame filler top ply over the at least one frame filler inner ply at one or more of the frame filler location such that the at least one frame filler inner ply at at least one of the frame filler locations is captured between a frame filler bottom ply and a frame filler top ply.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 1 is a top view of an example of a manufacturing system for laying up a composite laminate (e.g., a stringer laminate) with integral frame fillers;

FIG. 2 is a side view of the manufacturing system taken along line 2-2 of FIG. 1;

FIG. 3 is a magnified top view of the encircled region identified by reference numeral 3 of FIG. 1 and illustrating a plurality of lamination heads supported over a lamination table for laying up (e.g., laminating) composite plies to produce a stringer laminate having integral frame fillers;

FIG. 4 is a side view of the manufacturing system taken along line 4-4 of FIG. 3 and illustrating the plurality of lamination heads in end-to-end arrangement supported over a lamination table moving from right to left during lamination of the stringer laminate;

FIG. 5 is a sectional view of an example of the manufacturing system taken along line 5-5 of FIG. 3 and illustrating a lamination head supported by a crossbeam having opposing ends attached to a pair of vertical posts;

FIG. 6 is a side view of an example of a lamination head taken along line 6-6 of FIG. 5;

FIG. 7 is a perspective view of an example of a frame filler outer ply lamination head as one of the plurality of lamination heads for laying up the stringer laminate, the frame filler outer ply lamination head laminating a frame filler bottom ply at spaced intervals along a lamination table and defining a plurality of frame filler locations;

FIG. 8 is a sectional view taken along line 8-8 of FIG. 7 and illustrating a frame filler bottom ply supported on the lamination table;

FIG. 9 is a perspective view of an example of a first frame filler inner ply lamination head as an additional one of the plurality of lamination heads for laying up the stringer laminate, the first frame filler inner ply lamination head laminating a first frame filler inner ply over a protruding portion of the frame filler bottom ply at each frame filler location;

FIG. 10 is a sectional view taken along line 10-10 of FIG. 9 and illustrating a first frame filler inner ply laid up over the frame filler bottom ply;

FIG. 11 is a perspective view of an example of a second frame filler inner ply lamination head as an additional one of the plurality of lamination heads for laying up the stringer laminate, the second frame filler inner ply lamination head laminating a second frame filler inner ply over the first frame filler inner ply at each frame filler location;

FIG. 12 is a sectional view taken along line 12-12 of FIG. 11 and illustrating a second frame filler inner ply laid up over the first frame filler inner ply;

FIG. 13 is a perspective view of an example of a third frame filler inner ply lamination head as an additional one of the plurality of lamination heads for laying up the stringer laminate, the third frame filler inner ply lamination head laminating a third frame filler inner ply over the second frame filler inner ply at each frame filler location;

FIG. 14 is a sectional view taken along line 14-14 of FIG. 13 and illustrating a third frame filler inner ply laid up over the second frame filler inner ply;

FIG. 15 is a perspective view of an example of a first stringer body ply lamination head as an additional one of the plurality of lamination heads for laying up the stringer laminate, the first stringer body ply lamination head laminating a first stringer body ply extending continuously along the lamination surface and overlapping an overlapping portion of the frame filler bottom ply at each frame filler location;

FIG. 16 is a sectional view taken along line 16-16 of FIG. 15 and illustrating the first stringer body ply laid up over the overlapping portion of the frame filler bottom ply;

FIG. 17 is a perspective view of an example of a second stringer body ply lamination head as an additional one of the plurality of lamination heads for laying up the stringer laminate, the second stringer body ply lamination head laminating a second stringer body ply extending continuously over the first stringer body ply;

FIG. 18 is a sectional view taken along line 18-18 of FIG. 17 and illustrating the second stringer body ply laid up over the first stringer body ply;

FIG. 19 is a perspective view of an example of a third stringer body ply lamination head as an additional one of the plurality of lamination heads for laying up the stringer laminate, the third stringer body ply lamination head laminating a third stringer body ply extending continuously over the second stringer body ply;

FIG. 20 is a sectional view taken along line 20-20 of FIG. 19 and illustrating the third stringer body ply laid up over the second stringer body ply;

FIG. 21 is a perspective view of an example of a frame filler outer ply lamination head laying up a frame filler top ply over the third frame filler inner ply and the stringer body portion at each frame filler location;

FIG. 22 is a sectional view taken along line 22-22 of FIG. 21 and illustrating the frame filler top ply laid up over the third frame filler inner ply and extending across the width of the third stringer body ply;

FIG. 23 is a perspective view of an example of a stringer laminate having a stringer body portion and a plurality of frame filler portions protruding laterally from one of the stringer body side edges of the stringer body portion;

FIG. 24 is an exploded perspective view of the stringer laminate of FIG. 23;

FIG. 25 is a top view of an example of the stringer laminate of FIG. 24;

FIG. 26 is a sectional view taken along line 26-26 of FIG. 25 and illustrating the stringer body plies that make up the stringer body portion and further illustrating the opposing stringer body side edges each formed as a beveled edge;

FIG. 27 is a sectional view of the stringer laminate taken along line 27-27 of FIG. 25 and illustrating the stringer body plies in side-by-side arrangement with a corresponding one of the frame filler inner plies which define a bevel angle that is complementary to the beveled edge of the stringer body portion, and further illustrating the frame filler inner plies captured between the frame filler bottom ply and the frame filler top ply;

FIG. 28 is a sectional view taken along line 28-28 of FIG. 25 and illustrating the opposing end edges of the frame filler bottom ply, frame filler inner plies and frame filler top ply defining a bevel angle;

FIG. 29 is a perspective view of an example of a formed stringer having a trapezoidal cross-sectional shape after the forming and curing of a stringer laminate having frame filler portions protruding from one of the stringer body side edges of the stringer body portion;

FIG. 30 is a sectional view of the formed stringer taken along line 30-30 of FIG. 29 and illustrating the flange portions on each side of the formed stringer having opposing stringer body side edges each formed as a beveled edge;

FIG. 31 is a sectional view of the formed stringer taken along line 31-31 of FIG. 29 and illustrating a frame filler portion protruding from the flange portion on one side of the formed stringer;

FIG. 32 is a perspective view of an example of a composite structure having a skin panel to which are assembled a plurality of formed stringers each having frame filler portions protruding from one of the stringer body side edges of each formed stringer;

FIG. 34 is a sectional view of the composite structure taken along line 34-34 of FIG. 33 and illustrating the frame flanges of the frame mounted to the mating surfaces collectively defined by the flange portions and the frame filler portions, and further illustrating mechanical fasteners coupling the frame flange to the skin panel;

FIG. 35 is a sectional view of the composite structure taken along line 35-35 of FIG. 34 and illustrating the frame flange of the frame supported on a frame filler portion and mechanically fastened to the skin panel;

FIG. 36 is a magnified view of the encircled region identified by reference numeral 36 of FIG. 34 with the frame and the mechanical fasteners omitted for clarity to illustrate the frame filler portion of one of the formed stringers extending across the skin panel to the stringer body side edge of an adjacent formed stringer;

FIG. 37 is a perspective view of an example of a composite structure configured as a fuselage barrel section having a plurality of formed stringers oriented generally longitudinally and having a plurality of axially-spaced circumferential frames covered by an exterior skin panel extending 360 degrees around the formed stringers and the circumferential frames;

FIG. 38 is a magnified view of the encircled region of the fuselage barrel section identified by reference numeral 38 of FIG. 37 and illustrating the circumferential frames mechanically fastened to the flange portions and frame filler portions of the formed stringers;

FIG. 42 is a top view of an example of a stringer laminate having frame filler portions protruding from each of opposing stringer body side edges of the stringer body portion;

FIG. 43 is a sectional view of the stringer laminate taken along line 43-43 of FIG. 42 and illustrating the stringer body plies in side-by-side arrangement with a corresponding one of the frame filler inner plies on each side of the stringer body portion and defining a bevel angle that is complementary to the beveled edge on each side of the stringer body portion;

FIG. 44 is a perspective view of an example of a formed stringer after the forming and curing of a stringer laminate having frame filler portions protruding from each of the opposing stringer body side edges;

FIG. 45 is a perspective view of an example of a composite structure configured as a panel assembly having a plurality of formed stringers coupled to a skin panel, and showing one of the formed stringers having frame filler portions protruding from each of the opposing stringer body side edges;

FIG. 46 is a perspective view of an example of a manufacturing system in which one of the frame filler lamination heads is configured as a dual-spindle lamination head for simultaneously laminating a pair of frame filler inner plies in spaced parallel relation to each other;

FIG. 47 is a sectional view taken along line 47-47 of FIG. 46 and illustrating a spaced pair of frame filler inner plies formed over a frame filler bottom ply;

FIG. 51 is a top view of an example of a manufacturing system having a stationary lamination surface and a plurality of lamination heads configured to translate over the lamination surface during the production of a stringer laminate;

FIG. 52 is a side view of the manufacturing system taken along line 52-52 of FIG. 51;

DETAILED DESCRIPTION

Figure 33:
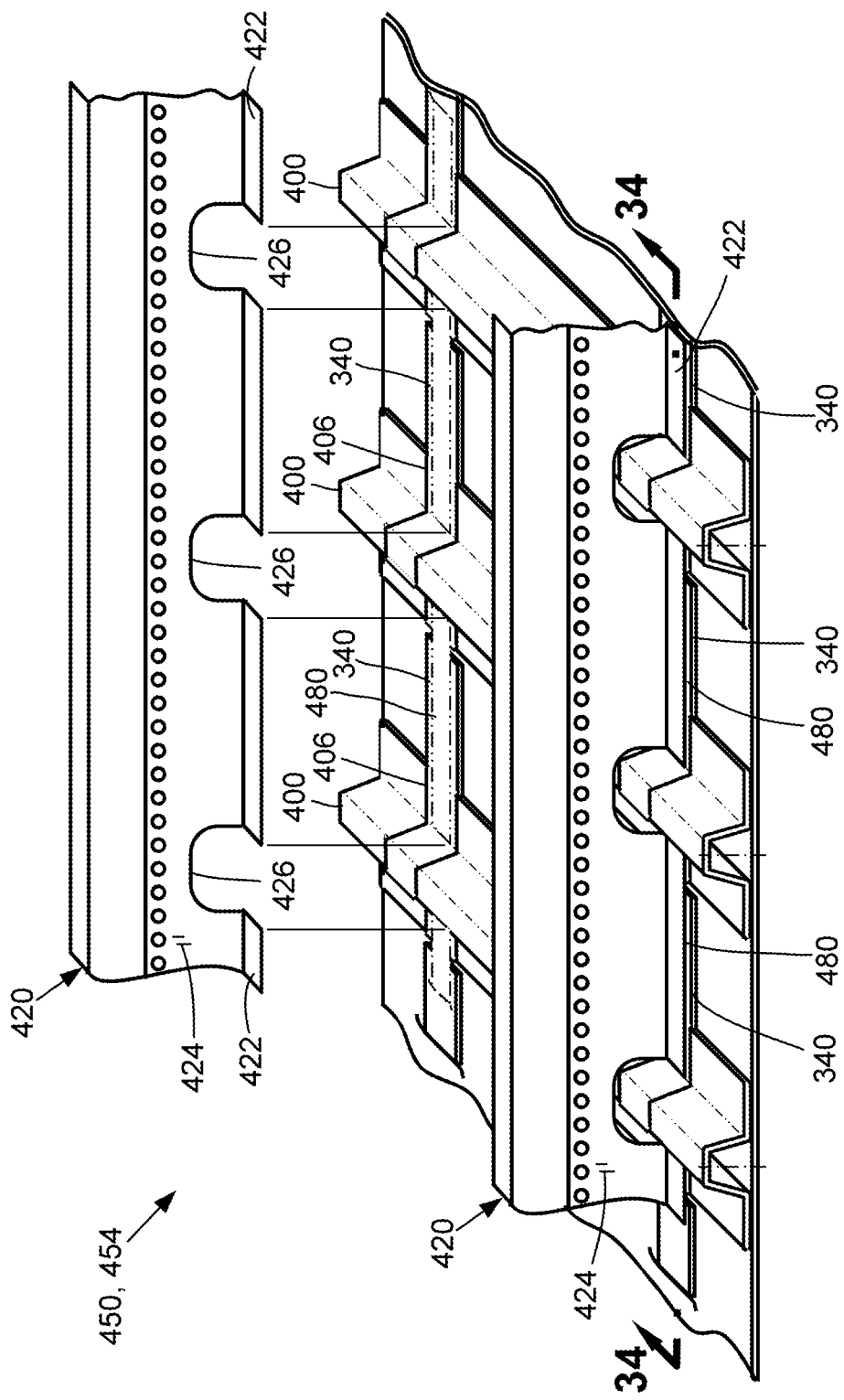
FIG. 33 is a perspective view of an example of a composite structure configured as a panel assembly having a plurality of formed stringers coupled to a skin panel and further illustrating a pair of frames for coupling to the composite structure, a forwardmost one of the frames shown coupled to the mating surfaces collectively defined by the flange portions and frame filler portions of the stringer laminates, and the aftermost one of the frames shown separated away from the mating surfaces defined by the flange portions and the frame filler portions.

Referring now to the drawings which illustrate various examples of the disclosure, shown in FIG. 1 is a top view of an example of a manufacturing system 100 for laying up an uncured composite laminate 298 (e.g., a stringer laminate 300) with integrated extensions 398 (e.g., frame filler portions 340) that are integral with the composite laminate 298. FIG. 2 is a side view of the manufacturing system 100 of FIG. 1. The presently-disclosed examples of the manufacturing system 100 are described in the context of laying up a stringer laminate 300 (e.g., FIG. 23) having integrated frame filler portions 340 (i.e., integrated extensions 398) and which may be formed into a desired cross-sectional shape of a formed stringer 400 (e.g., FIG. 29).

A stringer laminate 300 represents one of a variety of composite laminate 298 configurations that may be laid up using the presently disclosed manufacturing system 100. In one implementation, a stringer laminate 300 may be formed into a desired cross-sectional profile of a formed stringer 400, a plurality of which may be assembled with and co-cured or co-bonded with a skin panel for stiffening the skin panel. In one example, a plurality of formed stringers 400 may be positioned on a rotatable layup mandrel (not shown), and an exterior skin panel 456 (FIGS. 37-38) may be laid up over the formed stringers 400 and layup mandrel. The exterior skin panel 456 and the formed stringers 400 may be co-cured, and mating structure such as circumferential frames 420 (e.g., FIGS. 37-38) may be mechanically fastened to the inner surface of the skin panel 456 to produce a fuselage barrel section 452 (e.g., FIGS. 37-38) as described in greater detail below. The frame filler portions 340 of the stringer laminate 300 fill the above-described gaps (not shown) that exist between the circumferential frames 420 and the inner surface of the skin panel 456.

Advantageously, the integration of the frame filler portions 340 with the stringer laminate 300 allows for a significant improvement in the assembly of barrel sections 452 relative to the labor-intensive and time-consuming conventional methods of filling gaps between the frames 420 and the skin panel 456. For example, one such conventional method involves manually manufacturing individual frame fillers (not shown) by cutting a composite ply into a uniquely-shaped strip and then folding the strip along designated fold lines to create a frame filler that has the appropriate length, width, and thickness. Once the cut and fold operation is complete, each frame filler must be manually installed at the proper location on a layup mandrel (not shown) prior to laying up the skin panel. For certain locations on a fuselage barrel section, an additional composite ply patch (not shown) may be required to accommodate differences in flange thickness of adjacent stringers. Such ply patches must also be manually cut out of composite material and mounted at the appropriate location on the layup mandrel. As may be appreciated, the manual cutting, folding, and installing of individual frame fillers and ply patches at multiple locations on a fuselage barrel section is a labor-intensive and/or costly process that significantly impacts production rate.

Another conventional method of fabricating frame fillers involves laying up each stringer laminate (not shown) in a width that accommodates the width of the bay between adjacent formed stringers (e.g., FIG. 37). Once the laying up of the stringer laminate is complete, the stringer laminate is trimmed to produce a tab out (i.e., a frame filler) protruding from at least one side of the stringer laminate at locations along the stringer length where each circumferential frame will be subsequently installed. The trimming of each stringer laminate to produce a plurality of tabs outs along the stringer length significantly adds to the stringer production time. Furthermore, the portions of the stringer laminate that are trimmed away represent a relatively large amount of unused composite material which increases the overall cost of stringer production.

Advantageously, the presently-disclosed examples of the manufacturing system 100 enable the laying up of any one a variety of different configurations of composite laminates 298 (e.g., FIGS. 1-2) with integrated extension 398 (FIG. 1) in a timely and cost-effective manner. As mentioned above, the manufacturing system 100 examples are not limited to laying up stringer laminates 300 having frame filler portions 340 for subsequent forming into composite stringers (FIG. 29).

In the example of FIGS. 1-2, the manufacturing system 100 includes a plurality of lamination heads 200 configured to lay up composite plies 302 (e.g., FIGS. 7-22) of a stringer body portion 320 (FIG. 23) of a stringer laminate 300 while simultaneously laying up composite plies 302 to laminate a frame filler portion 340 (FIG. 23) at each of a plurality of frame filler locations 342 spaced along the length of the stringer body portion 320. Advantageously, the presently-disclosed manufacturing system 100 and method 500 (FIG. 54) avoids the need for fabrication of composite stringers and the separate labor-intensive process of fabricating individual frame fillers. In addition, the presently-disclosed manufacturing system 100 and method 500 avoids the time-consuming process of positioning individual frame fillers (not shown) at the mounting location of frames in a composite structure 450 (e.g., FIG. 37). In this regard, stringer laminates 300 fabricated using the presently-disclosed manufacturing system 100 and method 500 result in a reduction in the total quantity of parts that must be assembled to produce a composite structure 450, and enable an increase in production throughput in the fabrication of composite structures 450 stiffened by composite stringers.

Referring to FIGS. 1-4, the manufacturing system 100 includes a lamination surface 120 and a plurality of lamination heads 200. The lamination heads 200 are configured to lay up composite plies 302 (e.g., FIGS. 7-22) of composite material 238 along a dispensing direction 254 (FIG. 6) onto the lamination surface 120 and/or onto previously-applied composite plies 302 during relative movement between the lamination surface 120 and the lamination heads 200 along a direction generally aligned with the dispensing direction 254. The lamination heads 200 may be configured to lay up composite plies 302 along a dispensing direction 254. The plurality of lamination heads 200 include at least one frame filler outer ply lamination head 202 (e.g., FIGS. 7 and 21), at least one frame filler inner ply lamination head 204 (e.g., FIGS. 9, 11, and 13), and at least one stringer body lamination head 210 (e.g., FIGS. 15, 17, and 19).

In the example shown in FIGS. 1-4, the manufacturing system 100 includes a frame filler outer ply lamination head 202 (FIG. 7) for laminating a frame filler bottom ply 350 at each of the frame filler locations 342. The example manufacturing system 100 also has three frame filler inner ply lamination heads 204, 206, 208 (FIGS. 9, 11, and 13) which are laterally offset from the stringer body ply lamination heads 210, 212, 214 (FIGS. 15, 17, 19). Each one of the frame filler inner ply lamination heads 204, 206, 208 is configured to laminate a frame filler inner ply 355 over the frame filler bottom ply 350 or over a previously-applied frame filler inner ply 355 at each one of the frame filler locations 342. As described in greater detail below, the frame filler inner plies 355 are laid up in stacked formation at each one of the frame filler locations 342. Although the presently-disclosed example of the manufacturing system 100 has three frame filler inner ply lamination heads, other examples of the manufacturing system 100 may include any number of frame filler inner ply lamination heads for laminating a corresponding quantity of frame filler inner plies 355 at each of the frame filler locations 342.

In the example shown, the manufacturing system 100 further includes three stringer body ply lamination heads 210, 212, 214 (FIGS. 15, 17, and 19) which, as mentioned above, are laterally offset from the frame filler inner ply lamination heads 204, 206, 208. Each one of the stringer body ply lamination heads 210, 212, 214 may be configured to lay up a stringer body ply 325 (FIGS. 15, 17, 19). Each stringer body ply 325 extends along the lamination surface 120 and overlaps the frame filler bottom ply 350 located at each frame filler location 342, or overlaps a previously applied stringer body ply 325. As described in greater detail below, the stringer body plies 325 are in stacked formation and collectively define the stringer body portion 320 of the stringer laminate 300. Each stringer body ply 325 is in side-by-side arrangement with a frame filler inner ply 355 (FIG. 22). In some examples, the quantity of stringer body ply lamination heads 210, 212, 214 may be equal to the quantity of frame filler inner ply lamination heads 204, 206, 208 such that the quantity of stringer body plies 325 is equal to the quantity of frame filler inner plies 355. Although the present-disclosed example of the manufacturing system 100 has three stringer body ply lamination heads, other examples of the manufacturing system 100 may include any number of stringer body ply lamination heads.

In the example of FIGS. 1-4, the manufacturing system 100 includes a frame filler outer ply lamination head 202 (FIG. 21) for laminating a frame filler top ply 348 at each of the frame filler locations 342. Alternatively, the frame filler outer ply lamination head 202 that is used to lay up the frame filler bottom ply 350 may also be used to lay up the frame filler top ply 348. The frame filler top plies 348 extend across the combined width of the stringer body portion 320 and the frame filler inner plies 355 at each frame filler location 342. The frame filler inner plies 355 at each frame filler location 342 are captured between the frame filler bottom ply 350 and the frame filler top ply 348, resulting in an uncured stringer laminate 300 having a plurality of frame filler portions 340 protruding laterally from at least one stringer body side edge 324 of the stringer body portion 320. The frame filler bottom plies 350, the frame filler inner plies 355, the stringer body plies 325, and the frame filler top plies 348 may all be formed of constant-width composite material 238, thereby eliminating the need for trimming the stringer laminate 300 after the layup is complete.

In FIGS. 1-4, the lamination heads 200 are stationary and define a lamination station 198 of the manufacturing system 100. The lamination heads 200 may be supported by a support frame 104, and may be positioned in end-to-end relation to each other to define a series of lamination heads 200. Although the lamination heads 200 are shown uniformly spaced apart from each other, the lamination heads 200 may be non-uniformly spaced apart. Although the lamination heads 200 are shown in close proximity to each other, the lamination heads 200 may be arranged such that there are gaps between the lamination heads 200. The series of lamination heads 200 may be arranged to sequentially lay up the frame filler bottom plies 350 (FIG. 7), the frame filler inner plies 355 (FIGS. 9-14, the stringer body plies 325 (FIGS. 15-20, and the frame filler top plies 348 (FIGS. 21-22) to laminate the stringer body portion 320 and the frame filler portions 340 with a desired ply stacking sequence defined by the positions of the lamination heads 200 relative to each other. Although the series of lamination heads 200 are shown in a linear arrangement, the lamination heads 200 may be non-linearly arranged such as in an arc shape (not shown). In this regard, the dispensing direction 254 collectively defined by the end-to-end series of lamination heads 200 may be linear or the dispensing direction 254 may be non-linear.

In FIGS. 1-4, the lamination surface 120 is configured to translate underneath the lamination heads 200 along the direction generally aligned with the dispensing direction 254 (FIG. 6) during the laying up of a stringer laminate 300. Although the lamination heads 200 in FIGS. 1-4 are non-movable at least along the lengthwise direction of the manufacturing system 100, any one or more of the lamination heads 200 may be movable along a transverse direction (perpendicular to the lengthwise direction). In addition, any one or more of the lamination heads 200 may be vertically movable relative to the lamination surface 120, as described in greater detail below.

In FIGS. 1-4, the lamination surface 120 comprises an outer surface or upper surface of a stationary, rigid lamination table 122 supported on a base member 102 of the manufacturing system 100. The lamination table 122 may be a generally rigid structure that is translatable underneath the lamination heads 200 along a direction parallel to the dispensing direction 254. The lamination table 122 may be supported on longitudinal rails 124 extending along a lengthwise direction of the base member 102. The manufacturing system 100 may include a linear actuation mechanism (not shown) such as a screw drive coupled to a drive motor for translating the lamination table 122 along the longitudinal rails 124.

In FIGS. 1-2, the lamination table 122 may be movable from a lamination surface home position 130 and passes through the lamination station 198 prior to arriving at a lamination surface aft position 132. In some examples, the lamination table 122 may be limited to translation along a single direction for laying up a stringer laminate 300 as the lamination table 122 makes one pass through the lamination station 198. However, in other examples, the lamination table 122 may be configured to translate back and forth underneath the lamination heads 200 for laying up a stringer laminate 300. For example, the lamination table 122 may make two passes in opposite directions through the lamination station 198 for laying up a stringer laminate 300. After the layup of the stringer laminate 300 is complete, the lamination table 122 may be movable to a lamination surface off-loading position (not shown).

Referring to FIGS. 5-6, shown in FIG. 5 is a sectional view of an example of the manufacturing system 100 showing a lamination head 200 that is stationary relative to the lamination table 122. The lamination table 122 is shown supported on longitudinal rails 124 mounted on the base member 102. Each lamination head 200 may be supported by the above-mentioned support frame 104 which may include a crossbeam 108 having opposing ends respectively attached to a pair of vertical posts 106 extending upwardly from the base member 102. The lamination heads 200 may be horizontally (e.g., laterally) movable along the crossbeam 108 via linear actuation mechanisms (not shown) for laterally positioning the lamination heads 200 relative to each other. The lamination heads 200 may be independently laterally movable along the crossbeam 108 to allow for lateral positioning of the lamination heads 200 to allow for the laying up any one of a variety of configurations of stringer laminates 300 having different width requirements for the stringer body portion 320 and for the frame filler portions 340 (FIG. 1).

In addition to lateral movement capability along the crossbeams 108, each one of the lamination heads 200 may be vertically movable in correspondence with the starting and stopping of the dispensing of layup material 236 from the lamination heads 200. For example, the opposing ends of the crossbeam 108 may be vertically movable relative to the posts 106 via linear actuation mechanisms (not shown). In any one of the examples (e.g., FIGS. 1-21 and 48-53) disclosed herein, the movement of the lamination surface 120 (e.g., lamination table 122), the movement of the lamination heads 200 (e.g., lengthwise movement, lateral positioning, vertical movement), and the operation of the below-described components of each lamination head 200 may be controlled by a controller 116 (FIG. 5) executing computable readable program instructions (e.g., a numerical-control program). For example, in the manufacturing system 100 shown in FIGS. 1-21, the controller 116 may control the lateral positioning and vertical movement of the stationary lamination heads 200 while controlling the lengthwise movement of the lamination table 122 relative to the lamination heads 200. In the example manufacturing system 100 shown in FIGS. 48-50, the controller 116 may control the lateral positioning and vertical movement of the stationary lamination heads 200 relative to the movable lamination belt 126. In the example manufacturing system 100 shown in FIGS. 51-53, the controller 116 may control the lengthwise movement of the lamination heads 200 while also controlling the lateral positioning and vertical movement of the lamination heads 200 relative to the stationary lamination surface 120.

FIG. 6 is a side view of an example of a lamination head 200. Each lamination head 200 is configured to dispense a layup material 236 such as composite material 238 along a dispensing direction 254. The components of lamination head 200 may be mounted on a mounting frame 230 which may be coupled to a crossbeam of a support frame 104 (e.g., FIG. 5) or a gantry 110 (e.g., FIG. 53). In the example shown, the lamination head 200 may include at least one material supply drum 232 configured to support a material roll 234 of layup material 236. The layup material 236 may be a backed material 240 or an unbacked material (not shown). The backed material 240 may be backed by a backing layer 242 that prevents the layup material 236 from adhering to adjacent wraps of layup material 236 on the material roll 234.

As mentioned above, the layup material 236 may be a composite material 238 for laying up (i.e., laminating) composite plies 302 for forming the stringer laminate 300 (FIG. 1). The composite material 238 may be a pre-impregnated fiber-reinforced polymeric material or resin, or the composite material 238 may be a dry fiber material that is infused with resin (e.g., polymeric material) after lamination of the stringer laminate 300 is complete and the stringer laminate is formed into the desired cross-sectional shape. The resin or polymeric material may be a thermosetting resin or a thermoplastic resin. The fibers may be glass fibers (e.g., fiberglass), carbon fibers, Kevlar fibers, boron fibers, aramid fibers, metallic fibers, ceramic fiber and/or other fiber materials. The composite material 238 may be provided as unidirectional tape, cloth, woven fabric or in other configurations. In addition to dispensing composite material 238, the lamination heads 200 may also be configured to dispense non-composite material such as metallic foil or metallic mesh during the layup of a stringer laminate 300. The layup material 236 may also include processing material used in processing the stringer laminate 300. Such processing material may facilitate the laminating, forming, consolidating, debulking, and/or curing of the stringer laminate 300 or may facilitate the bonding and/or assembly of the stringer laminate 300 with other composite parts (e.g., a skin panel 456—FIG. 32) or with non-composite structures (not shown).

For example, prior to laying up a stringer laminate 300, one or more of the lamination heads (not shown) may be configured to dispense a protective material (e.g., peel ply) on the lamination surface 120 to serve as a protective layer 306 (FIGS. 7-8) for preventing contamination of the surface of the stringer laminate 300 to facilitate the bonding of the formed stringer (e.g., FIG. 32) to another composite part such as the above-mentioned skin panel 456. At the completion of the layup of the composite plies 302 of the stringer laminate 300, a lamination head (not shown) may also be configured to apply a protective layer (not shown) on top of the stringer laminate 300 to prevent contamination during subsequent handling of the stringer laminate 300 such as forming the stringer laminate 300 into a desired cross-sectional shape of a formed stringer 400 (e.g., FIG. 29). In another example, one or more of the lamination heads 200 may be configured to dispense an adhesive material (e.g., tackifier film—not shown) for laying up (e.g., laminating) an adhesive layer on one or both of opposing surfaces of the stringer laminate 300 for increasing adhesion between the stringer laminate 300 and the lamination surface 120 and/or to facilitate the assembly of the stringer laminate 300 with another composite part. In a still further example, one or more of the lamination heads 200 may be configured to dispense a release material (e.g., fluorinated ethylene propylene) for laying up (e.g., laminating) a release layer on one or both of opposing surfaces of the stringer laminate 300 to prevent adhesion between the stringer laminate 300 and another surface such as a forming mandrel (not shown) and/or a curing mandrel (not shown).

Referring still to FIG. 6, the lamination head 200 may include one or more redirect rollers 244 for guiding the layup material 236 through the components of the lamination head 200. The lamination head 200 may further include a cutter assembly 246 for cutting the layup material 236 during the starting and stopping of the dispensing of the layup material 236, such as when laying up the frame filler bottom ply (e.g., FIG. 7), the frame filler inner plies (e.g., FIGS. 9, 11, and 13), and the frame filler top ply (e.g., FIGS. 15, 17, and 19) at each of the frame filler locations 342. For backed material 240 such as composite material 238, the cutter assembly 246 may be configured to cut the composite material 238 while leaving the backing layer 242 intact. The lamination head 200 may include a compaction device 250 such as a compaction roller or a compaction shoe for applying and compacting the layup material 236 onto the lamination surface 120 or onto previously applied layup material 236. In addition, the lamination head 200 may include a backing layer separator 248 for separating the layup material 236 from the backing layer 242, and a backing layer collection drum 252 configured to take up the backing layer 242 after separation from the layup material 236.

Referring to FIGS. 7-22, shown is the sequential layup of composite plies 302 by the frame filler outer ply lamination heads 202 (FIGS. 7 and 21), the frame filler inner ply lamination heads 204, 206, 208 (FIGS. 9, 11, and 13), and the stringer body ply lamination heads 210, 212, 214 (FIGS. 15, 17, and 19) for laminating a stringer laminate 300 (FIGS. 21-22). As mentioned above, the presently-disclosed examples of the manufacturing system 100 are configured to lay up an uncured composite laminate 298 (e.g., a stringer laminate 300) with integrated extensions 398 (e.g., frame filler portions 340) that are integral with the composite laminate 298. FIGS. 7-22 illustrate the laying up of a stringer laminate 300 as one example of any one a variety of configurations of a composite laminate 298 (FIGS. 1-2) that may be laid up by the manufacturing system 100. In this regard, the lamination heads 200 in FIG. 7-22 are configured to lay up composite laminate 298 configured as a stringer laminate 300 having integrated frame filler portions 340. The frame filler outer ply lamination heads 202 may be described as integrated extension outer ply lamination heads. Similarly, the frame filler inner ply lamination heads 204, 206, 208 may be described as integrated extension inner ply lamination heads. The stringer body ply lamination heads 210, 212, 214 may be described as laminate body ply lamination heads.

FIG. 7 shows an example of a frame filler outer ply lamination head 202 laying up a frame filler bottom ply 350 at each of the frame filler locations 342 spaced along the lamination table 122. In the example shown, the lamination table 122 may be movable relative to the lamination heads 200, which may be stationary. However, a manufacturing system 100 may include lamination heads 200 that are movable over a stationary lamination surface 120, such as in the below-described example shown in FIGS. 51-53. FIG. 8 is a schematic sectional view of the manufacturing system 100 taken at one of the frame filler locations 342 in FIG. 7 and showing a frame filler bottom ply 350 supported on a protective layer 306 on the lamination table 122. The frame filler outer ply lamination head 202 may be configured to dispense composite material 238 for laminating each of the frame filler bottom plies 350 at a common width. The frame filler bottom plies 350 may be laid up directly on the lamination surface 120 (e.g., lamination table 122). Alternatively, the frame filler bottom plies 350 may be laid up over a processing layer 304 that may be previously applied to the lamination surface 120 by a processing material lamination head (not shown). As mentioned above, the protective layer 306 may prevent contamination of the bottom surface of the stringer laminate 300. In addition, the resin in the composite material 238 of the stringer laminate 300 may lightly adhere to the protective layer 306 which may prevent the stringer laminate 300 from shifting during the layup process. In any one of the manufacturing system 100 examples disclosed herein, the lamination surface 120 may optionally include a plurality of apertures (not shown) coupled to a vacuum pressure source (not shown) for drawing vacuum pressure on the composite ply 302 for preventing movement of the stringer laminate 300 during layup.

Referring to FIGS. 9-14, shown is an example of the above-described frame filler inner ply lamination heads 204, 206, 208 laying up the frame filler inner plies 355 of the stringer laminate 300. FIG. 9 is a perspective view of the manufacturing system 100 showing a first frame filler inner ply lamination head 204 for laying up a first frame filler inner ply 356 over a protruding portion 352 (FIG. 24) of the frame filler bottom ply 350 at each frame filler location 342 such that an overlapping portion 354 (FIG. 24) of each frame filler bottom ply 350 is non-covered by the first frame filler inner ply 356 at each frame filler location 342. The first frame filler inner ply 356 may be laid up over the frame filler bottom ply 350 at each frame filler location 342 immediately after the frame filler bottom ply 350 is laid up over the lamination table 122. FIG. 10 is a schematic sectional view of the manufacturing system 100 taken at a frame filler location 342 of FIG. 9 and showing a first frame filler inner ply 356 laid up over the frame filler bottom ply 350. In FIG. 9, the first frame filler inner ply lamination head 204 may be laterally offset from the frame filler outer ply lamination head 202. In addition, the first frame filler inner ply lamination head 204 may be configured to dispense composite material 238 that has a width that is less than the width of the composite material 238 dispensed by the frame filler outer ply lamination head 202 such that the frame filler inner ply covers only the protruding portion 352 of the frame filler bottom ply 350, leaving the overlapping portion 354 temporarily exposed prior to laying up of the first stringer body ply 326 (FIG. 15) as described below.

FIG. 11 is a perspective view of the manufacturing system 100 showing a second frame filler inner ply lamination head 206 as an additional one of the plurality of lamination heads 200 for laying up the stringer laminate 300. The manufacturing system 100 may be configured such that the second frame filler inner ply lamination head 206 lays up a second frame filler inner ply 358 over the first frame filler inner ply 356 at each frame filler location 342 immediately after the layup of the first frame filler inner ply 356 by the first frame filler inner ply lamination head 204. FIG. 12 is a schematic sectional view of the manufacturing system 100 taken at a frame filler location 342 of FIG. 11 and showing the second frame filler inner ply 358 laid up over the first frame filler inner ply 356. In some examples, the composite material 238 dispensed by the second frame filler inner ply lamination head 206 may have a narrower width than the composite material 238 dispensed by the first frame filler inner ply lamination head 204 as a means for generating a beveled edge 382 (FIG. 14) on at least one frame filler side edge 346 (FIG. 14) of the frame filler portion 340. As described below, the stringer body plies 325 (FIG. 22) may also be laid up with progressively narrower widths to result in a beveled edge 382 that is complementary to the beveled edge 382 of the frame filler inner plies 355.

FIG. 13 is a perspective view of the manufacturing system 100 showing a third frame filler inner ply lamination head 208 as an additional one of the plurality of lamination heads 200 for laying up the stringer laminate 300. The third frame filler inner ply lamination head 208 is configured to lay up a third frame filler inner ply 360 over the second frame filler inner ply 358 at each frame filler location 342. The third frame filler inner ply 360 may be laid up immediately after the layup of the second frame filler inner ply 358. FIG. 14 is a schematic sectional view of the manufacturing system 100 taken at a frame filler location 342 of FIG. 13 and showing a third frame filler inner ply 360 laid up over the second frame filler inner ply 358. Similar to the above-described difference in width of the composite material 238 between the first frame filler inner ply 356 and the second frame filler inner ply 358, the third frame filler inner ply 360 may have a narrower width than the second frame filler inner ply 358 for producing the beveled edge 382 (FIG. 14) on the frame filler side edge 346 of the frame filler portion 340.

Referring to FIGS. 15-20, shown is an example of the stringer body ply lamination heads 210, 212, 214 laying up the stringer body plies 325 adjacent to the frame filler inner plies 355. As mentioned above, the stringer body plies 325 define the stringer body portion 320. One or more of the stringer body plies 325 may extend continuously along the length of the stringer laminate 300. However, in other examples not shown, the stringer laminate 300 may include one or more splices or other aspects (e.g., ply drops and/or ply adds) that result in one or more of the stringer body plies 325 being discontinuous along the length of the stringer laminate 300. FIG. 15 is a perspective view of the manufacturing system 100 showing an example of a first stringer body ply lamination head 210 laying up a first stringer body ply 326 of the stringer body portion 320. The first stringer body ply 326 is shown extending continuously along the lamination surface 120 and overlapping the overlapping portion 354 of the frame filler bottom ply 350 at each frame filler location 342. However, as indicated above, the first stringer body ply 326 may include one or more splices in the first stringer body ply 326 that results in the first stringer body ply 326 being discontinuous along the length of the stringer laminate 300. For example, the first stringer body ply 26 may be made up of two or more stringer body ply segments (not shown) of which the terminal ends overlap each other. Alternatively or additionally, the first stringer body ply 326 may have a length that is less than the total length of the stringer laminate 300, such that the first stringer body ply 326 defines a ply drop (not shown) in the stringer laminate 300. The first stringer body ply 326 is shown in side-by-side arrangement (e.g., butt jointed) with the first frame filler inner ply 356. However, in other examples not shown, the first stringer body ply 326 may overlap a portion of the first frame filler inner ply 356. FIG. 16 is a schematic sectional view of the manufacturing system 100 taken at one of the frame filler locations 342 and showing the first stringer body ply 326 laid up over the overlapping portion 354 of the frame filler bottom ply 350 and in side-by-side arrangement with the first frame filler inner ply 356. The width of the first stringer body ply 326 may be approximately equal to the difference between the width of the frame filler bottom ply 350 and the width of the first frame filler inner ply 356. In some examples, the edge of the stringer body ply may be in abutting and non-overlapping contact with the edge of the first frame filler inner ply 356. However, in some examples, a relatively small ply gap 370 (e.g., less than 0.030 inch) may exist between the edge of the first stringer body ply 326 and the edge of the frame filler inner ply.

FIG. 17 is a perspective view of the manufacturing system 100 showing an example of a second stringer body ply lamination head 212 for laying up a second stringer body ply 328 which is shown extending continuously over the first stringer body ply 326. However, as indicated above with regard to the first stringer body ply 326, the second stringer body ply 328 may include one or more splices or other aspects that may result in the second stringer body ply 328 being discontinuous along the length of the stringer laminate 300. FIG. 18 is a schematic sectional view of the manufacturing system 100 taken at one of the frame filler locations 342 and showing the second stringer body ply 328 laid up over the first stringer body ply 326. The composite material 238 dispensed by the second stringer body ply lamination head 212 may have a greater width than the composite material 238 dispensed by the first stringer body ply lamination head 210 as a means to produce a beveled edge 382 in the stringer body plies 325 that complementary to the bevel angle 380 (FIG. 22) of the frame filler inner plies 355. In addition, the second stringer body ply 328 may have a width that results in the stringer body side edge 324 having a beveled edge 382 (FIG. 22). Similar to the above-described arrangement shown in FIG. 16, the second stringer body ply 328 in FIG. 18 may be in side-by-side arrangement with the second frame filler inner ply 358 to minimize the ply gap 370.

FIG. 19 is a perspective view of the manufacturing system 100 showing an example of a third stringer body ply lamination head 214 for laying up a third stringer body ply 330 extending continuously over the second stringer body ply 328. However, as indicated above with regard to the first stringer body ply 326 and the second stringer body ply 328, the third stringer body ply 330 may optionally be discontinuous along the length of stringer laminate 300. FIG. 20 is a schematic sectional view of the manufacturing system 100 taken at one of the frame filler locations 342 and showing the third stringer body ply 330 laid up over the second stringer body ply 328. Similar to the above-described arrangement shown in FIGS. 15-18, the composite material 238 dispensed by the third stringer body ply lamination head 214 may have a greater width than the composite material 238 dispensed by the second stringer body ply lamination head 212 to produce a beveled edge 382 that is complementary to the bevel angle 380 of the frame filler inner plies 355.

FIG. 21 is a perspective view of the manufacturing system 100 showing an example of a frame filler outer ply lamination head 202 laying up a frame filler top ply 348 over the third frame filler inner ply 360 and the stringer body portion 320 at each frame filler location 342. FIG. 22 is a schematic sectional view of the manufacturing system 100 taken at one of the frame filler locations 342 and illustrating the frame filler top ply 348 laid up over the third frame filler inner ply 360. The frame filler top ply 348 at each frame filler location 342 extends across the combined width of the third stringer body ply 330 and the third frame filler inner ply 360 such that at each frame filler location 342, the first, second, and third frame filler inner plies 356, 358, 360 are captured between a frame filler bottom ply 350 and a frame filler top ply 348. Although not shown in FIG. 22, the frame filler top ply 348 and the frame filler bottom ply 350 may each be laid up in a width that is complementary to (e.g., substantially matches) the bevel angle 380 of the frame filler inner plies 355 and the stringer body plies 325. As mentioned above, each one of the first, second, and third stringer body plies 326, 328, 330 is in side-by-side arrangement with a corresponding one of the first, second, and third frame filler inner plies 356, 358, 360. However, as mentioned above, the stringer laminate 300 may be laid up in a configuration in which the first, second, and/or third stringer body plies 326, 328, 330 are arranged in overlapping relation with a corresponding one of the first, second, and third frame filler inner plies 356, 358, 360. For examples of the stringer laminate 300 in which the stringer body side edges 324 are beveled edges 382, the frame filler inner plies 355 may be laid up prior to the stringer body plies 325. In other examples of the stringer laminate 300 not shown in which the stringer body side edges 324 are non-beveled, the stringer body plies 325 may be laid up before or after the laying up of the frame filler inner plies 355. Although FIG. 22 shows the frame filler side edge 346 being non-beveled, the frame filler side edge 346 may be beveled at a bevel angle 380 that is complementary to the bevel angle 380 of the stringer body side edge 324 of an adjacent formed stringer 400 as shown in FIG. 36 to allow the beveled edge 382 of the frame filler portion 340 to be positioned in close proximity to the beveled edge 382 of the flange portion 406 of another formed stringer 400. In addition, although the stringer laminate 300 in FIG. 22 has an equal number of stringer body plies and frame filler inner plies as a means to provide a consistent surface (e.g., constant height) for receiving mating structure (e.g., FIG. 33), a stringer laminate 300 may be laid up in a configuration (not shown) in which the number of frame filler inner plies is different than the number of stringer body plies. In addition, a stringer laminate 300 may be laid up in a configuration (not shown) in which the number of frame filler inner plies at any frame filler location 342 is different than the number frame filler plies at one or more of the remaining frame filler locations 342.

Referring to FIGS. 23-28, shown is an example of the stringer laminate 300 laid up in the above-described process illustrated in FIGS. 7-22. As mentioned above, the stringer laminate 300 represents one example of any one a variety of different composite laminate 298 (FIGS. 1-2) configurations that may be laid up by any one of the presently-disclosed examples of the manufacturing system 100. FIG. 23 is a perspective view of the stringer laminate 300 comprised of the stringer body portion 320 and the plurality of frame filler portions 340 protruding laterally from one of the stringer body side edges 324 of the stringer body portion 320 at a corresponding plurality of frame filler locations 342. FIG. 24 shows an exploded perspective view of the stringer laminate 300 of FIG. 23. As mentioned above, each one of the frame filler bottom plies 350 includes a protruding portion 352 and an overlapping portion 354. The frame filler inner plies 355 are laid up over the protruding portion 352, and the stringer body plies 325 are laid up over the overlapping portion 354. FIGS. 23-28 illustrate an example of a stringer laminate 300 formed using first, second, and third stringer body ply lamination ply heads 210, 212, 214 (FIG. 21) laterally positioned relative to the frame filler outer ply lamination heads 202 (FIG. 21) to result in the protruding portion 352 of the frame filler bottom ply 350 at each frame filler location 342 protruding from a single one of the stringer body side edges 324 of the stringer body portion 320. However, in other examples (FIGS. 42-43) described below, the stringer body ply lamination heads 210, 212, 214 may be positioned relative to the frame filler outer ply lamination heads 202 to result in the protruding portion 352 at each one of the frame filler locations 342 protruding from each one of the opposing stringer body side edges 324 of the stringer body portion 320.

Referring to FIGS. 25-28, shown in FIG. 25 is a top view of an example of a stringer laminate 300 having a plurality of frame filler portions 340 protruding from a stringer body side edge 324 of the stringer body portion 320. As described above, the stringer body portion 320 is made up of a frame filler top ply 348 at each frame filler location 342, one or more stringer body plies 325 extending along a lengthwise direction of the stringer laminate 300, and a frame filler bottom ply 350 at each frame filler location 342. In some examples, the stringer body portion 320 may be formed to have a length-to-width aspect ratio of no less than 2. As mentioned above, the stringer body portion 320 has opposing stringer body end edges 322 defining the stringer body length. In addition, the stringer body portion 320 has opposing stringer body side edges 324 defining the width of the stringer body portion 320. In addition, as described above, the stringer laminate 300 includes a plurality of frame filler portions 340 each made up of a frame filler top ply 348, one or more frame filler inner plies 356, and a frame filler bottom ply 350 at each frame filler location 342.

As mentioned above, the stringer body ply lamination heads 210, 212, 214 may dispense composite material 238 having differing widths that result in at least one of the opposing stringer body side edges 324 being formed as a beveled edge 382. For example, FIG. 26 is a sectional view of the stringer body portion 320 of FIG. 25 showing both of the opposing stringer body side edges 324 formed as a beveled edge 382. FIG. 27 is a sectional view of the stringer laminate 300 taken at one of the frame filler locations 342 of FIG. 25. The stringer laminate 300 is shown inverted from the orientation of the stringer laminate 300 in FIG. 22 such that the frame filler bottom ply 350 is on top and the frame filler top ply 348 is on the bottom of the stringer laminate 300 in FIG. 27. The stringer body plies 325 are in side-by-side arrangement with the corresponding frame filler inner plies 355. The bevel angle 380 of the stringer body side edge 324 is complementary to the bevel angle 380 of the frame filler inner plies 355. FIG. 28 is a sectional view taken along a lengthwise direction of one of the frame filler portions 340 showing the opposing frame filler end edges 344 of the frame filler plies defining a bevel angle 380. In any one of the examples disclosed herein, laminating the stringer body portion 320 and/or the frame filler portion 340 with beveled edges 382 may reduce stress concentrations that may otherwise occur in a skin panel 456 (FIG. 32) or other composite part that is assembled to the stringer laminate 300.

Referring to FIG. 29-35, shown are examples of a formed stringer 400 resulting from the forming of a stringer laminate 300 (FIG. 25) manufactured using the presently-disclosed manufacturing system 100 and method. In the example shown, the formed stringer 400 has a trapezoidal cross-sectional shape after the forming and curing of a stringer laminate 300 having frame filler portions 340 protruding from one of the stringer body side edges 324 of the stringer body portion 320. The stringer laminate 300 may be formed in any one a variety of alternative cross-sectional shapes including, but not limited to, the above-mentioned trapezoidal shape, or a rounded cross-sectional shape, a square cross-sectional shape, a triangular cross-sectional shape, or other cross-sectional shapes.

In FIGS. 29-32, the formed stringer 400 has a pair of flange portions 406 and a pair of web portions 404 interconnected by a cap portion 402. FIG. 30 is a sectional view of the formed stringer 400 taken along the stringer body portion 320. The flange portions 406 of the formed stringer 400 each have a stringer body side edge 324 that is formed as a beveled edge 382. FIG. 31 is a sectional view of the formed stringer 400 taken along one of the frame filler portions 340. The frame filler portion 340 is shown protruding from the flange portion 406 on one side of the formed stringer 400. FIG. 32 is a perspective view of an example of a composite structure 450 having a skin panel 456 (e.g., cured or uncured) to which may be assembled a plurality of formed stringers 400 (e.g., cured or uncured) each having frame filler portions 340 protruding from one of the stringer body side edges 324 of each formed stringer 400. The frame filler portions 340 protruding from each formed stringer 400 extend to the stringer body side edge 324 of the adjacent formed stringer 400. The formed stringers 400 may be co-bonded or co-cured with the skin panel 456. The frame filler portions 340 and flange portions 406 provide flush mating surfaces 408 to which other structures such as a frame 420 (FIG. 33) may be mounted.

For example, FIG. 33 shows a composite structure 450 configured as a panel assembly 454 having a plurality of formed stringers 400 co-bonded or co-cured to a skin panel 456, and further including a pair of frames 420 that may be mechanically fastened to the skin panel 456. Although the skin panel 456 is shown having a planar shape, the skin panel 456 may have a non-planar shape and the formed stringers 400 may be formed complementary to the non-planar shape of the skin panel 456. For example, the formed stringers 400 may each be slightly curved along the lengthwise direction to match a corresponding curve in the skin panel 456. Each one of the frames 420 may include a frame web 424 and a frame flange 422 assembled together. However, in other examples not shown, the frame web 424 and frame flange 422 may be integrated such that each one of the frames 420 is a unitary structure. The frame web 424 and frame flange 422 of each frame 420 may include stringer cutouts 426 that are sized and configured complementary to the size and spacing of the formed stringers 400 on the skin panel 456. In FIG. 33, one of the frames 420 is shown mounted on the mating surfaces 408 collectively defined by the flange portions 406 and frame filler portions 340 of the stringer laminates 300. The remaining frame 420 is shown separated away from the formed stringers 400 and skin panel 456 to reveal the mating surfaces 408 collectively defined by the flange portions 406 and the frame filler portions 340.

FIG. 34 is a sectional view of the composite structure 450 of FIG. 33 showing the frame flanges 422 of the frame 420 mounted on the mating surfaces 408 defined by the combination of the flange portions 406 and the frame filler portions 340. Also shown are mechanical fasteners 428 coupling the frame flange 422 to the skin panel 456. As can be seen, the frame filler portions 340 and the flange portions 406 provide a flush mating surface 408 for the frame flanges 422. FIG. 35 is a sectional view of the composite structure 450 showing the frame flange 422 of the frame 420 supported on the frame filler portion 340 and fastened to the skin panel 456. FIG. 36 shows the formed stringers 400 coupled to the skin panel 456. The frame 420 and the mechanical fasteners 428 are omitted from FIG. 36 to illustrate the mating surface 408 defined by the flange portion 406 and the frame filler portion 340 of one formed stringer 400 being substantially flush (e.g., within 0.010 inch) with the flange portion 406 of an adjacent formed stringer 400.

Referring to FIGS. 37-38, shown is an example of a composite structure 450 configured as a fuselage barrel section 452 having a plurality of formed stringers 400 oriented generally longitudinally. In addition, the fuselage barrel section 452 includes a plurality of axially-spaced circumferential frames 420, and an exterior skin panel 456 which extends 360 degrees around the formed stringers 400 and the circumferential frames. At least some of the frames may have a generally rounded (e.g., an ovalized circle) cross-sectional shape. The circumferential frames 420 may be coupled to the mating surfaces 408 defined by the flange portions 46 and the frame filler portions 340 of the formed stringers 400. Similar to the above-described arrangement shown in FIGS. 34-36, the circumferential frames 420 of the fuselage barrel section 452 may be mechanically fastened to the skin panel 466, the flange portions 406 and the frame filler portions 340 of the formed stringers 400.

Figure 39:
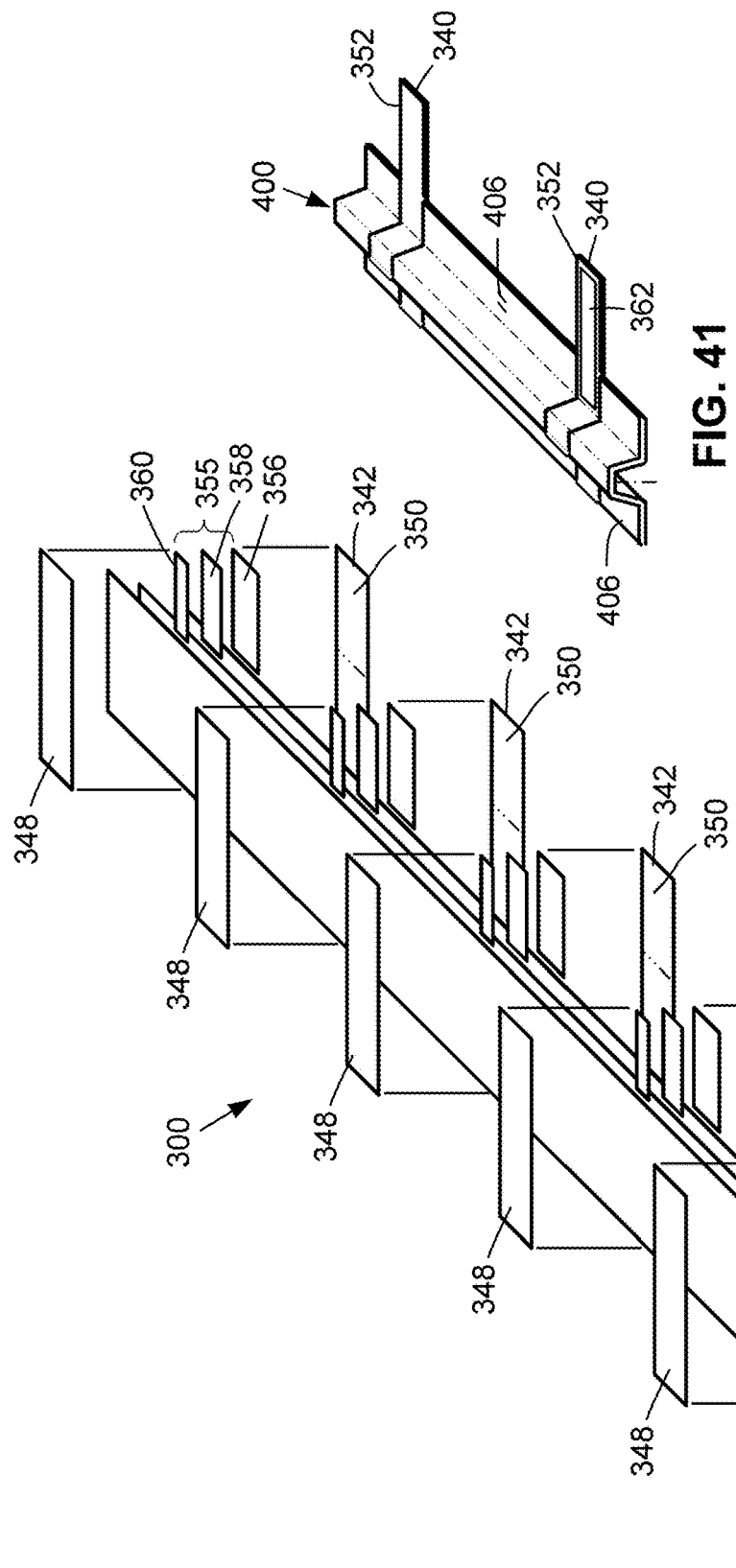
FIG. 39 is a perspective exploded view of a further example of a stringer laminate having a frame filler external ply laid up in a manner to be laminated to on an outer side of one of the frame filler bottom plies for accommodating a difference in thickness of the flange portion of adjacent formed stringers.
Figure 41:
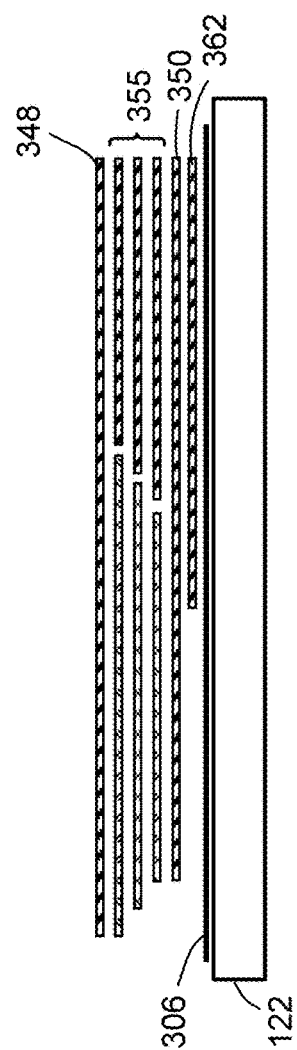
FIG. 41 is a perspective view of an example of a formed stringer after the forming and curing of a stringer laminate configured similar to FIGS. 39-40, and further illustrating a frame filler external ply on one of the frame filler portions.
Figure 40:
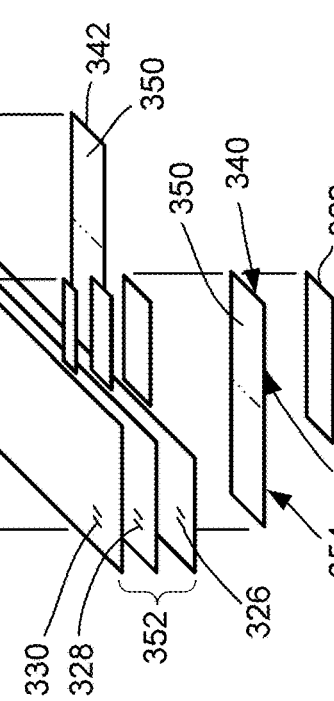
FIG. 40 is a sectional view of the stringer laminate taken along line 40-40 of FIG. 39 and illustrating the frame filler external ply located below the frame filler bottom ply.

Referring to FIGS. 39-41, shown in FIG. 39 is an exploded perspective view of an example of a stringer laminate 300 having a frame filler external ply 362 included with one of the frame filler portions 340. As shown in FIG. 40, the frame filler external ply 362 is in addition to the frame filler top ply 348, frame filler inner plies 355, and frame filler bottom ply 350 of a stringer laminate 300. For manufacturing the stringer laminate 300 of FIGS. 39-41, the manufacturing system 100 may include a frame filler external ply lamination head (not shown) configured to layup one or more frame filler external plies 362 (e.g., a ply patch) on the lamination surface 120 at one or more of the frame filler locations 342 prior to laying up the frame filler bottom ply 350 at each frame filler location 342. After laying up the stringer laminate 300, the stringer laminate 300 may be formed in a manner such that the frame filler external ply 362 is located on the top side of the frame filler protruding portion 352 and extends across the flange portion 406 of the formed stringer 400 as shown in FIG. 41. A stringer laminate 300 may be laid up to include or more of the frame filler external plies 362 at one or more frame filler locations 342 to accommodate a larger thickness in the flange portion 406 of an adjacent formed stringer 400 of a composite structure 450.

FIG. 42 is a top view of an example of a stringer laminate 300 having frame filler portions 340 protruding from each of opposing stringer body side edges 324 of the stringer body portion 320. FIG. 43 is a sectional view of the stringer laminate 300 taken at one of the frame filler locations 342 showing the stringer body plies 325 in side-by-side arrangement with the corresponding frame filler inner plies 355 on each side of the stringer body portion 320. The frame filler inner plies 355 and stringer body plies 325 may be laid up in a width that defines a bevel angle 380 on each side of the stringer body portion 320. For manufacturing of such a stringer laminate 300, the stringer body ply lamination heads 210, 212, 214 (FIGS. 15, 17, 19) may be configured to lay up the stringer body plies 325 such that the frame filler bottom ply 350 at each frame filler location 342 protrudes from each one of the opposing stringer body side edges 324 of the stringer body portion 320. The manufacturing system 100 may include additional frame filler inner ply lamination heads (not shown) for laying up frame filler inner plies 355 on each side of the stringer body portion 320.

In one example, the manufacturing system 100 may include at least one dual-spindle lamination head 216 (e.g., FIG. 46) as described below for simultaneously laying up frame filler inner plies 355 over each of opposing sides of the frame filler bottom ply 350 at each frame filler location 342. In addition, the frame filler outer ply lamination head 202 (FIG. 46) may be configured to lay up the frame filler top ply 348 (FIG. 43) at each frame filler location 342 such that the frame filler top ply 348 has opposing protruding portions 352 that respectively protrude from the opposing stringer body side edges 324 of the stringer body portion 320 and are complementary to the protruding portions 352 of the frame filler bottom ply 350 at each frame filler location 342. In this manner, the frame filler inner plies 355 on each side of the stringer body portion 320 are captured between the frame filler bottom ply 350 and frame filler top ply 348 at each frame filler location 342.

Referring to FIGS. 44-45, shown in FIG. 44 is an example of a formed stringer 400 resulting from the forming of a stringer laminate 300 having frame filler portions 340 protruding from each of the opposing stringer body side edges 324. FIG. 45 shows an example of a panel assembly 454 having a plurality of formed stringers 400 coupled to a skin panel 456. Two of the formed stringers 400 are manufactured without frame filler portions 340. The remaining formed stringer 400 has frame filler portions 340 protruding from each of the opposing stringer body side edges 324. The frame filler portions 340 are sized and configured to extend to the stringer body side edges 324 of the adjacent formed stringers 400 to provide a flush mating surface 408 for receiving another component such as a frame flange 422 of a frame 420 (FIGS. 34-36).

Referring to FIGS. 46-47, shown in FIG. 46 is an example of a manufacturing system 100 having a dual-spindle lamination head 216. At least one of the above-described frame filler inner ply lamination heads 204, 206, 208 (FIGS. 9, 11, 13) may be configured as a dual-spindle lamination head 216. As mentioned above, a dual-spindle lamination head 216 may simultaneously laminate a spaced-apart pair of frame filler inner plies 355 at each frame filler location 342 as shown in FIG. 47. Alternatively or additionally, at least one of the above-described stringer body ply lamination heads 210, 212, 214 (FIGS. 15, 17, 19) may be configured as a dual-spindle lamination head 216 to allow for laminating parallel stringer body plies 325 in side-by-side relation to each other. Each dual-spindle lamination head 216 may include dual material rolls 234. The dual material rolls 234 may respectively feed two streams of layup material 236 to dual cutter assemblies 246. For examples where the material rolls 234 contain backed material 240, the dual-spindle lamination head 216 may include dual backing layer separators 248 and dual backing layer collection drums 252.

Figure 48:
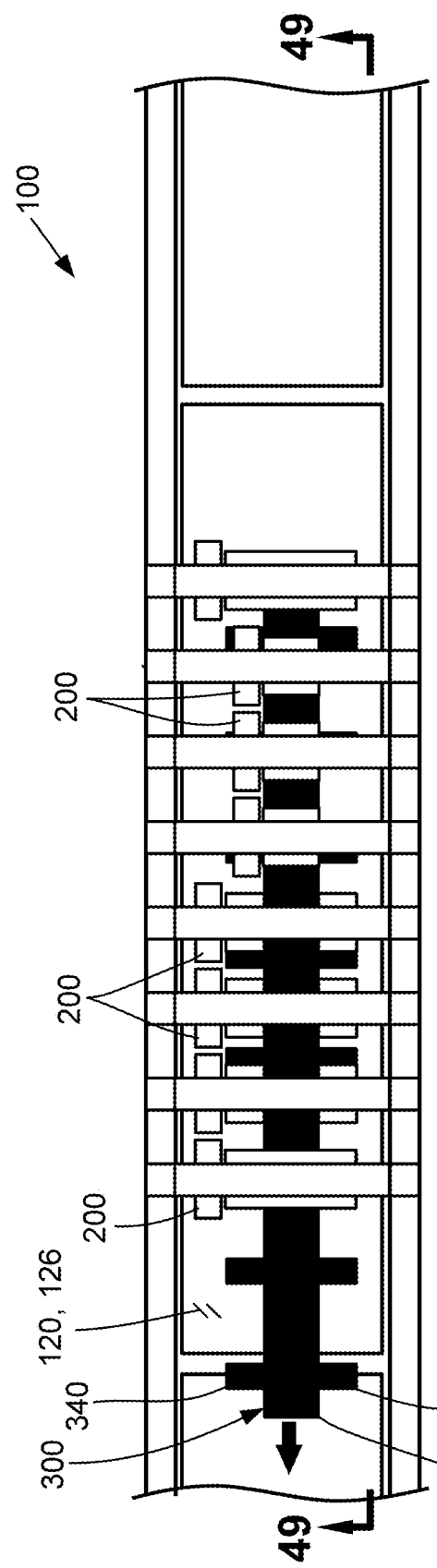
FIG. 48 is a top view of an example of a manufacturing system having a continuous loop lamination belt movable underneath a plurality of lamination heads that are stationary.
Figure 49:
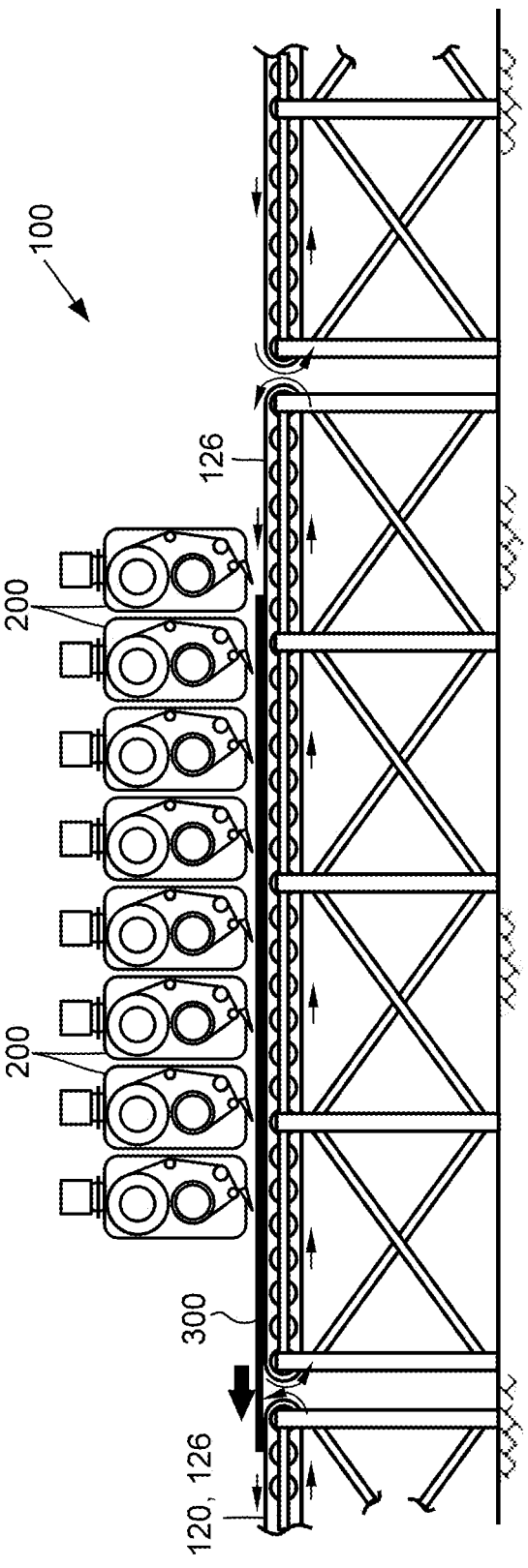
FIG. 49 is a side view of the manufacturing system taken along line 49-49 of FIG. 48 and illustrating a stringer laminate supported on the lamination belt movable underneath the plurality of lamination heads.
Figure 50:
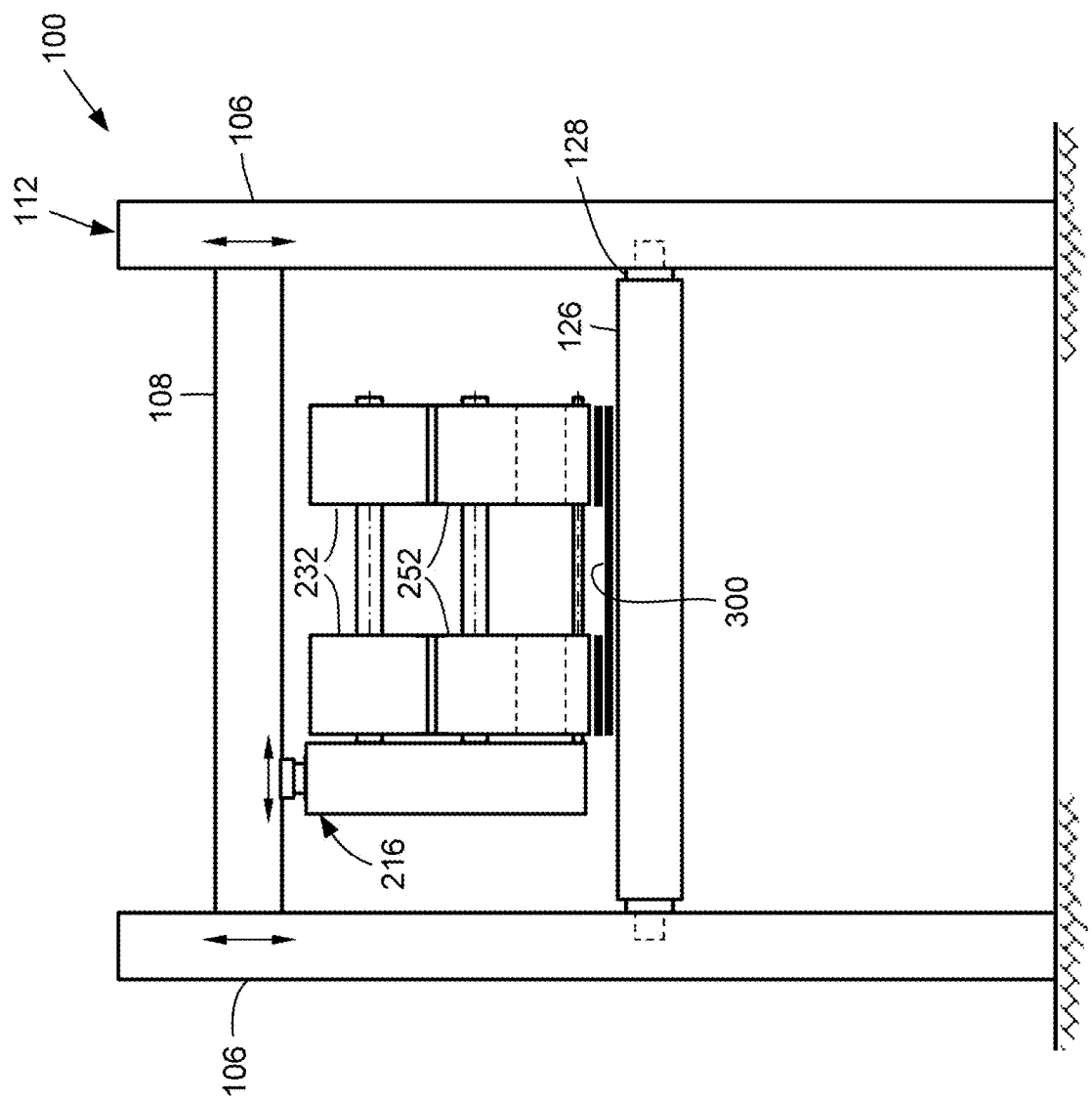
FIG. 50 is a sectional view of a manufacturing system illustrating a lamination head configured as a dual-spindle lamination head.

Referring to FIGS. 48-50, shown in FIG. 48 is a top view of an example of a manufacturing system 100 in which the lamination surface 120 is a continuous loop lamination belt 126. The lamination surface 120 comprises the outer surface of the lamination belt 126 which is movable along a direction generally parallel to the dispensing direction 254 (FIG. 6) of the lamination heads 200. FIG. 49 is a side view of the manufacturing system 100 showing a stringer laminate 300 supported on the lamination belt 126 movable underneath the lamination heads 200. FIG. 50 shows an example of a lamination head 200 shown supported above the continuous loop lamination belt 126. The lamination head 200 is configured as a dual-spindle lamination head 216 as described above. However, the manufacturing system 100 of FIGS. 48-50 may include one or more single-spindle configurations of the lamination head 200 as described above. The lamination heads 200 are stationary and may be supported by a beam support 112. For example, the support structure for one or more lamination heads 200 may include one or more crossbeams 108 supported by one or more posts 106.

The lamination belt 126 in FIGS. 48-50 may be applicable to any one of the above-described manufacturing systems 100. For example, the lamination heads 200 in FIGS. 48-50 may be configured and operated in a manner similar to any one of the above-described examples, such as the arrangement shown in FIGS. 9-22. The lamination belt 126 may be made up of a resiliently bendable material such as rubber, plastic, or other flexible material. As an alternative to flexible material, the lamination belt 126 may be made up of a continuous series of hinged metal mesh or relatively short rigid plates connected end-to-end. The lamination belt 126 may be supported by a plurality of rollers 128 at least one of which may be driven by a drive motor (not shown). In addition, the rollers 128 may provide stiffness to prevent deflection of the upper surface of the lamination upon which layup material 236 is applied.

Figure 53:
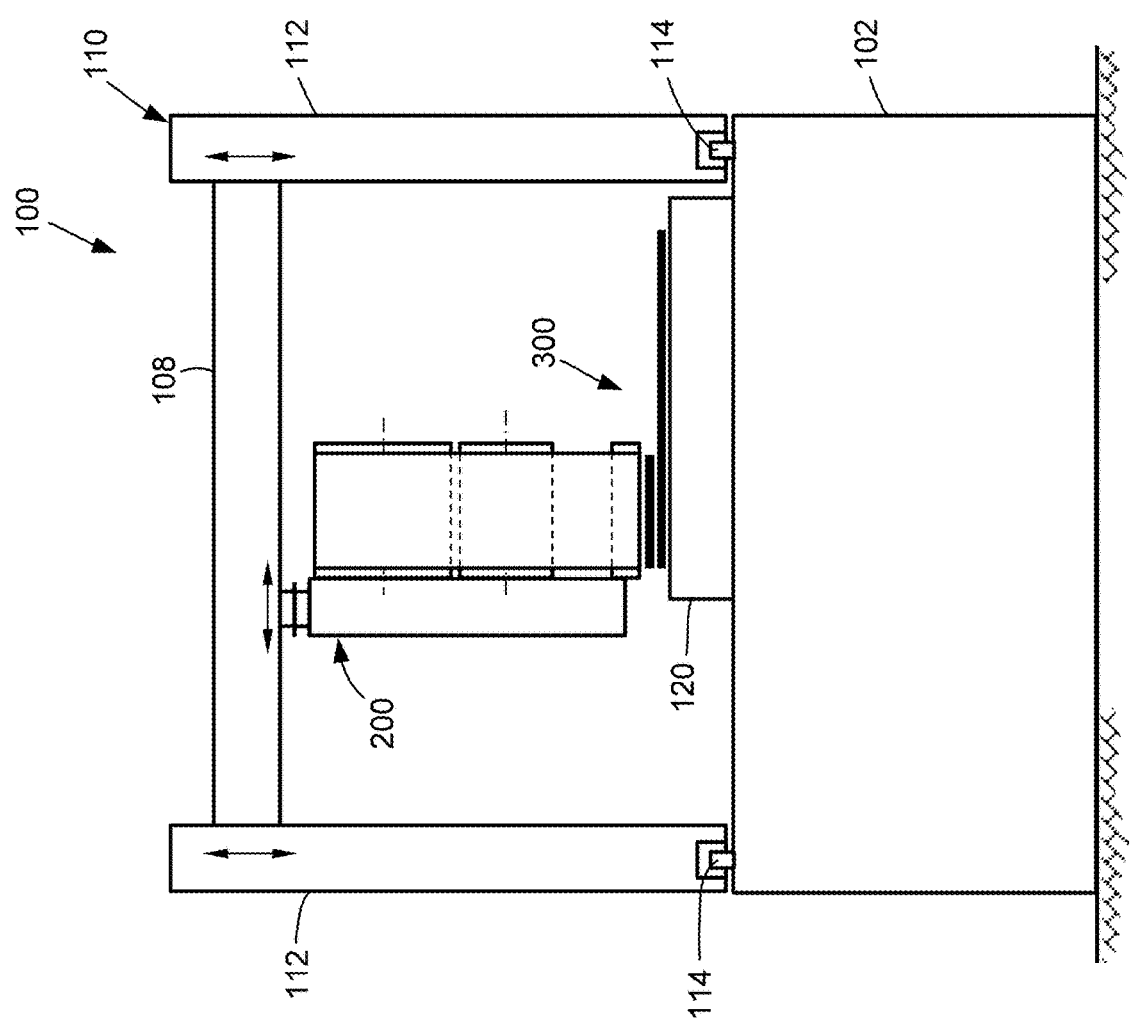
FIG. 53 is a sectional view of the manufacturing system taken along line 53-53 of FIG. 52.
Figure 54:
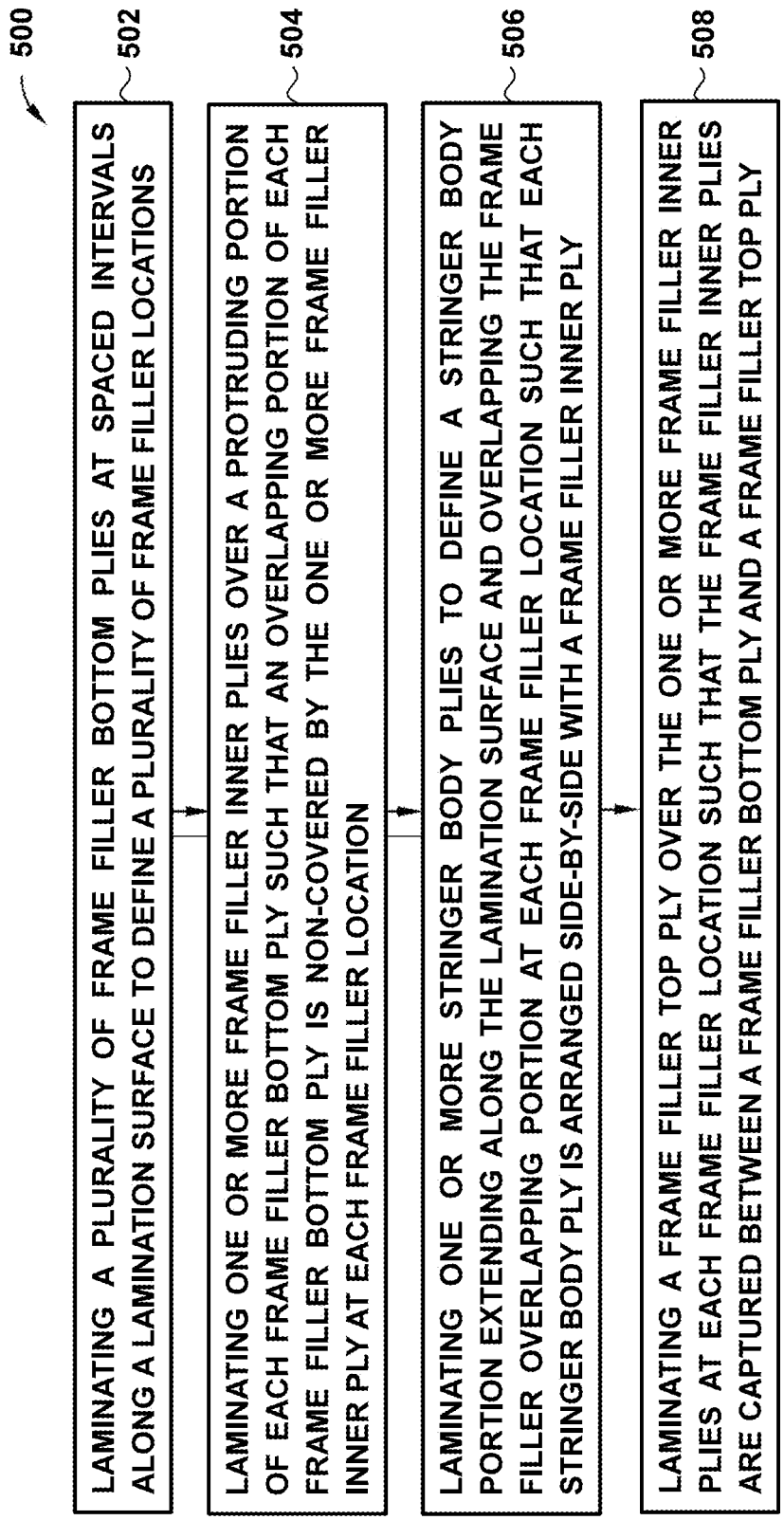
FIG. 54 is a flowchart including operations in a method of laying up a stringer laminate.

Referring to FIGS. 51-53, shown in FIG. 51 is a top view of an example of a manufacturing system 100 having a stationary lamination surface 120 and a plurality of lamination heads 200 configured to translate over the lamination surface 120 during the laying up of a stringer laminate 300. The lamination heads 200 in FIGS. 51-53 may be configured and operated in a manner similar to any one of the above-described arrangements. For example, the lamination heads 200 in FIGS. 51-53 may be configured similar to the above-described arrangement shown in FIGS. 9-22. FIG. 52 is a side view of the manufacturing system 100 of FIG. 51, and FIG. 53 is a sectional view of the manufacturing system 100. As mentioned above, the lamination surface 120 is stationary and the lamination heads 200 are configured to translate over the lamination surface 120 along a direction generally aligned with the dispensing direction 254 (FIG. 6) during the laying up of a stringer laminate 300. In the example shown, the lamination heads 200 may be supported by a gantry 110 that is movable along the base member 102. For example, the gantry 110 may include a crossbeam 108 having opposing ends that are respectively coupled to a pair of beam supports 112. The crossbeam 108 may be vertically movable relative to the beam supports 112. Each one of the beam supports 112 may be horizontally movable respectively along gantry tracks 114 that may be incorporated into the base member 102. Although shown supported by a gantry 110, the lamination heads 200 may be supported by any one of a variety of arrangements including, but not limited to, one or more robotic devices, a cantilevered support system, or other arrangements Referring to FIG. 54, shown is a flowchart including operations of a method 500 of laying up a stringer laminate 300. Prior to laying up the stringer laminate 300, the method may include applying a processing layer 304 onto at least one of the lamination surface 120 and the stringer laminate 300. As mentioned above, the manufacturing system 100 may optionally include one or more processing material lamination head (not shown) for applying any one a variety of processing materials prior to, during, or after laying up the stringer laminate 300. Such processing materials may include an adhesive material, a protective material, or a release material. Some processing materials may aid in the processing of the stringer laminate 300 after layup. For example, FIGS. 7-22 show a protective layer 306 applied to prevent contamination of an outer surface of the stringer laminate 300.

Referring to FIGS. 7-8, step 502 of the method 500 includes laminating, using at least one frame filler outer ply lamination head 202, a plurality of frame filler bottom plies 350 at spaced intervals along the lamination surface 120 to define a plurality of frame filler locations 342. In the example shown, the frame filler outer ply lamination head 202 may be configured to dispense composite material 238 having a constant width to laminate the plurality of frame filler bottom plies 350 onto a moving lamination table 122, or onto a processing layer 304 (e.g., a protective layer 306) previously applied to the lamination table 122, as shown in FIG. 7.

Referring to FIGS. 9-14, step 504 of the method 500 includes laminating, using at least one frame filler inner ply lamination head 204, one or more frame filler inner plies 355 over a protruding portion 352 of each frame filler bottom ply 350 and such that an overlapping portion 354 of each frame filler bottom ply 350 is non-covered by the frame filler inner plies 355 at each frame filler location 342. For example, the first, second, and third frame filler inner ply lamination heads 204, 206, 208 may sequentially lay up the first, second, and third frame filler inner plies 356, 358, 360 in stacked formation over a protruding portion 352 of the frame filler bottom ply 350 at each frame filler location 342. Within a series of lamination heads (e.g., FIGS. 7-21), the first, second, and third frame filler inner ply lamination heads 204, 206, 208 may be generally aligned with each other, and may be laterally offset relative to the one or more frame filler outer ply lamination heads. In addition, the width of the frame filler inner plies 355 at each frame filler location 342 is less than the width of the frame filler bottom ply 350, resulting in the frame filler inner plies 355 covering only the protruding portion 352 of the frame filler bottom ply 350, leaving the overlapping portion 354 of the frame filler bottom ply 350 temporarily exposed. In some examples, step 504 of laminating the frame filler inner plies 355 may be performed using a dual-spindle lamination head 216 (FIGS. 46-47 to simultaneously lay up a pair of the frame filler inner plies 355 in spaced parallel relation to each other at each frame filler location 342

Referring to FIGS. 15-20, step 506 of the method 500 includes laminating, using at least one stringer body ply lamination head 210, 212, 214, one or more stringer body plies 325 to define a stringer body portion 320 extending along the lamination surface 120 and overlapping the overlapping portion 354 at each frame filler location 342 such that each stringer body ply 325 is in side-by-side arrangement with a frame filler inner ply 355. For example, the first, second, and third stringer body ply lamination head 210, 212, 214 may sequentially lay up the first, second, and third stringer body plies 326, 328, 330 in stacked formation over the overlapping portion 354 of the frame filler bottom ply 350 at each frame filler location 342. The first, second, and third stringer body ply lamination head 210, 212, 214 may be generally aligned with each other, and may be laterally offset relative to the first, second, and third frame filler inner ply lamination heads 204, 206, 208. The composite material 238 dispensed by the stringer body ply lamination heads 210, 212, 214 may have a width that is approximately equal to the difference between the width of the frame filler bottom ply 350 and the frame filler inner plies 355. As described above and shown in FIG. 20, each stringer body ply 325 may be in side-by-side arrangement with a corresponding frame filler inner ply 355. For examples where the stringer body portion 320 has a relatively wide width, step 506 of laminating the stringer body plies 325 may be performed using a dual-spindle lamination head 216 (FIG. 50) to laminate a pair of the stringer body plies 325 in spaced parallel relation to each other.

Referring to FIGS. 7-22, step 506 of laminating the stringer body plies 325 may include laterally positioning the stringer body ply lamination heads 210, 212, 214 relative to the frame filler bottom plies 350 such that the stringer body portion 320 overlaps the frame filler bottom ply 350 at each frame filler location 342 to result in the protruding portion 352 of each frame filler bottom ply 350 protruding from only one of the stringer body side edges 324 of the stringer body portion 320. For example, the above-described stringer laminate 300 in FIGS. 23-25 has a frame filler portion 340 at each frame filler location 342 protruding from only one stringer body side edge 324 of the stringer body portion 320. As shown in FIG. 32, for each formed stringer 400, the frame filler portions 340 (protruding from the stringer body side edge 324) extend to the flange portion 406 of an adjacent formed stringer 400 to thereby produce mating surfaces 408 upon which other components may be mounted, such as the frames 420 of the panel assembly 454 of FIG. 33.

In an alternative example shown in FIGS. 42-45, step 506 of laminating the stringer body plies 325 may include laterally positioning the stringer body ply lamination heads 210, 212, 214 relative to the frame filler bottom plies 350 such that the stringer body portion 320 overlaps the frame filler bottom ply 350 at each frame filler location 342 to result in the protruding portion 352 of each frame filler bottom ply 350 protruding from each one of the opposing stringer body side edges 324 of the stringer body portion 320. For example, the stringer laminate 300 in FIGS. 42-45 has frame filler portions 340 at each frame filler location 342 protruding from both stringer body side edges 324 of the stringer body portion 320. As shown in FIG. 45, the frame filler portions 340 protruding from both stringer body side edges 324 of one of the formed stringers 400 extends to the flange portion 406 of the adjacent stringers on both sides of the formed stringer 400.

Referring to FIG. 27, step 506 of laminating the stringer body plies 325 may include laminating the stringer body plies 325 such that at least one of the opposing stringer body side edges 324 is formed as a beveled edge 382. In such a scenario, step 504 of laminating the frame filler inner plies 355 may include laminating the frame filler inner plies 355 at each frame filler location 342 to define a bevel angle 380 that is complementary to the beveled edge 382 of the stringer body portion 320. FIG. 27 illustrates both of the stringer body side edges 324 having beveled edges 382. Referring to FIG. 28, step 504 of laminating the frame filler inner plies 355 may include laminating the frame filler inner plies 355 such that at least one of opposing frame filler end edges 344 is formed as a beveled edge 382. In FIG. 28, both of the frame filler end edges 344 are formed at a non-perpendicular bevel angle 380.

Referring to FIGS. 21-22, step 508 of the method 500 includes laminating, using the frame filler outer ply lamination head 202, a frame filler top ply 348 over the frame filler inner plies 355 at each frame filler location 342 such that the frame filler inner plies 355 are captured between a frame filler bottom ply 350 and a frame filler top ply 348, and resulting in an uncured stringer laminate 300 having a frame filler portion 340 protruding laterally from at least one of the stringer body side edges 324 of the stringer body portion 320 at each frame filler location 342. As mentioned above, each frame filler top ply 348 extends across the width of the stringer body plies 325 and the frame filler inner plies 355 at each frame filler location 342.

In the presently-disclosed method 500, steps 502, 504, 506, 508 of respectively laminating the frame filler bottom plies 350, the frame filler inner plies 355, the stringer body plies 325, and the frame filler top plies 348 may be sequentially performed by the lamination heads 200 arranged in end-to-end relation with each other to produce the stringer laminate 300 with a desired ply stacking sequence in the stringer body portion 320 and in the frame filler portions 340. The ply stacking sequence may be defined by positions of the lamination heads 200 relative to each other within the series of lamination heads 200.

Referring to FIGS. 39-40, the method 500 may optionally include laminating, using a frame filler external ply lamination head 200 (not shown) at least one frame filler external ply 362 over the lamination surface 120 at each frame filler location 342 prior to laminating the frame filler bottom plies 350. The frame filler external ply 362 may have a width that is at least as wide as the frame filler inner plies 355 and preferably extends into the stringer body portion 320 such that in the formed stringers 400, the frame filler external ply 362 overlaps the flange portion 406 of the formed stringer 400 as shown in FIG. 41 and described above.

The method 500 may include moving either the lamination heads 200 or the lamination surface 120 along a direction generally aligned with a dispensing direction 254 (FIG. 6) of the lamination heads 200 when laminating the plies. Referring to the example of the manufacturing system 100 shown in FIGS. 1-4, the method includes translating a lamination surface 120 underneath the lamination heads 200 along the direction generally aligned with the dispensing direction 254. In the example of FIGS. 1-4, the lamination heads 200 may be stationary at least along the dispensing direction 254 during the laying up of the stringer laminate 300. In the example of FIGS. 1-4 and 7-21, the method includes translating a rigid lamination table 122 along at least one direction to a lamination station 198 while laying up the plies on an outer surface of the lamination table 122 and/or on plies previously laid up by the lamination heads 200. In such an arrangement, the method may include laying up the stringer laminate 300 during one or more passes of the lamination table 122 through the lamination station 198. In the example of the manufacturing system 100 shown in FIGS. 48-50, the translating of the lamination surface 120 underneath the lamination heads 200 may include moving at least one continuous loop lamination belt 126 underneath the lamination heads 200 while laminating the composite plies 302 on an outer surface of the lamination belt 126 and/or on composite plies 302 previously formed by the lamination heads 200.

In a still further example shown in FIGS. 51-53, the method may include translating the lamination heads 200 over the lamination surface 120 along the direction generally aligned with the dispensing direction 254 (FIG. 6) while the lamination surface 120 is stationary during the laying up of the stringer laminate 300. In such example, the lamination heads 200 may be translatable over the lamination surface 120 via a gantry 110 that is movable along gantry tracks 114, as described above.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A manufacturing system for laying up a stringer laminate, comprising:
    a lamination surface;
    a plurality of lamination heads configured to dispense composite material along a dispensing direction and laminate plies on the lamination surface and on previously-formed plies during relative movement between the lamination surface and the lamination heads along a direction generally aligned with the dispensing direction, the plurality of lamination heads including:
       at least one frame filler outer ply lamination head configured to laminate a plurality of frame filler bottom plies at spaced intervals along the lamination surface to define a plurality of frame filler locations;
       at least one frame filler inner ply lamination head located upstream of the frame filler outer ply lamination head along the dispensing direction, and configured to laminate one or more frame filler inner plies over a protruding portion of the frame filler bottom ply at each frame filler location in a single pass of the frame filler outer ply lamination head and the frame filler inner ply lamination head, such that an overlapping portion of each frame filler bottom ply is non-covered by the frame filler inner ply at each frame filler location;
       at least one stringer body lamination head configured to laminate one or more stringer body plies defining a stringer body portion extending along the lamination surface and overlapping the overlapping portion at each frame filler location such that each stringer body ply is in side-by-side arrangement with a frame filler inner ply; and
       the frame filler outer ply lamination head configured to laminate a frame filler top ply over the one or more frame filler inner plies at each frame filler location such that the one or more frame filler inner plies at each frame filler location are captured between a frame filler bottom ply and a frame filler top ply, and resulting in an uncured stringer laminate having a plurality of frame filler portions protruding laterally from the stringer body portion.

2. The manufacturing system of claim 1, wherein:
    the plurality of lamination heads are positioned in end-to-end relation with each other and configured to laminate the frame filler bottom plies, the frame filler inner plies, the stringer body plies, and the frame filler top plies to produce the stringer laminate with a desired ply stacking sequence defined by positions of the lamination heads relative to each other.

3. The manufacturing system of claim 1, wherein:
    the plurality of lamination heads are stationary and the lamination surface is configured to translate underneath the lamination heads along the direction generally aligned with the dispensing direction during the laminating of the stringer laminate.

4. The manufacturing system of claim 3, wherein the lamination surface comprises one of:
    an outer surface of at least one rigid lamination table translatable underneath the lamination heads;
    an outer surface of at least one continuous loop lamination belt movable underneath the lamination heads.

5. The manufacturing system of claim 1, wherein:
    the lamination surface is stationary and the plurality of lamination heads are configured to translate over the lamination surface along the direction generally aligned with the dispensing direction during the laminating of the stringer laminate.

6. The manufacturing system of claim 1, wherein:
    the at least one stringer body lamination head is configured to laminate the stringer body portion such that the protruding portion of each frame filler bottom ply protrudes from a single one of opposing stringer body side edges of the stringer body.

7. The manufacturing system of claim 1, wherein:
    the at least one stringer body lamination head comprises two stringer body lamination heads configured to laminate the stringer body portion such that a pair of protruding portions of each frame filler bottom ply protrudes respectively from opposing stringer body side edges of the stringer body.

8. The manufacturing system of claim 7, wherein:
    at least one stringer body lamination head and/or at least one frame filler inner ply lamination head is configured as a dual-spindle lamination head configured to simultaneously laminate respectively a spaced-apart parallel pair of stringer body plies and a spaced-apart parallel pair of frame filler inner plies.

9. The manufacturing system of claim 1, wherein:
    the at least one stringer body lamination head is configured to laminate the stringer body plies such that at least one of opposing stringer body side edges is formed as a beveled edge; and
    the frame filler inner ply lamination head is configured to laminate the frame filler inner plies at each frame filler location to define a bevel angle that is complementary to the beveled edge of the stringer body.

10. The manufacturing system of claim 1, wherein:
    the plurality of lamination heads include a frame filler external ply lamination head configured to laminate at least one frame filler external ply over the lamination surface at one or more of the frame filler locations prior to laminating the frame filler bottom ply at each frame filler location.

11. The manufacturing system of claim 1, wherein:
    the plurality of lamination heads are each configured to dispense composite material provided as pre-impregnated fiber-reinforced polymeric material.

12. A method of laying up a stringer laminate, comprising:
    laminating, using at least one frame filler outer ply lamination head, a plurality of frame filler bottom plies at spaced intervals along a lamination surface to define a plurality of frame filler locations;
    laminating, using at least one frame filler inner ply lamination head located upstream of the frame filler outer ply lamination head along a dispensing direction, one or more frame filler inner plies over a protruding portion of each frame filler bottom ply in a single pass of the frame filler outer ply lamination head and the frame filler inner ply lamination head such that at least one overlapping portion of each frame filler bottom ply is non-covered by the frame filler inner ply at each frame filler location;

laminating, using at least one stringer body lamination head, one or more stringer body plies to define a stringer body portion extending along the lamination surface and overlapping the at least one overlapping portion at each frame filler location such that each stringer body ply is in side-by-side arrangement with a frame filler inner ply;

laminating, using the frame filler outer ply lamination head, a frame filler top ply over the one or more frame filler inner plies at each frame filler location such that the one or more frame filler inner plies at each frame filler location are captured between a frame filler bottom ply and a frame filler top ply, and resulting in an uncured stringer laminate having a plurality of frame filler portions protruding laterally from the stringer body portion; and moving either the lamination heads or the lamination surface along a direction generally aligned with a dispensing direction of the lamination heads when laminating the plies.

13. The method of claim 12, wherein the steps of laminating the plies are sequentially performed by the lamination heads arranged in end-to-end relation with each other to laminate the stringer laminate having a desired ply stacking sequence defined by positions of the lamination heads relative to each other.

14. The method of claim 12, wherein moving either the lamination heads or the lamination surface comprises:
translating the lamination surface underneath the lamination heads along the direction generally aligned with the dispensing direction while the plurality of lamination heads are stationary.

15. The method of claim 14, wherein translating the lamination surface underneath the lamination heads comprises one of:
translating a rigid lamination table underneath the lamination heads while laminating the plies on an outer surface of the lamination table and on plies previously formed by the lamination heads;
moving at least one continuous loop lamination belt underneath the lamination heads while laminating the plies on an outer surface of the lamination belt and on plies previously formed by the lamination heads.

16. The method of claim 12, wherein moving either the lamination heads or the lamination surface comprises:
translating the lamination heads over the lamination surface along the direction generally aligned with the dispensing direction while the lamination surface is stationary.

17. The method of claim 12, wherein laminating the one or more stringer body plies to define the stringer body portion comprises:
laterally positioning the at least one stringer body lamination head relative to the frame filler bottom plies such that the stringer body portion overlaps the frame filler bottom ply at each frame filler location to result in a single protruding portion of each frame filler bottom ply protruding from one of opposing stringer body side edges of the stringer body.

18. The method of claim 12, wherein laminating the one or more stringer body plies to define the stringer body portion comprises:
laterally positioning a pair of the stringer body lamination heads relative to the frame filler bottom plies such that the stringer body portion overlaps the frame filler bottom ply at each frame filler location to result in a pair of the protruding portions of each frame filler bottom ply protruding respectively from opposing stringer body side edges of the stringer body.

19. The method of claim 12, wherein laminating the one or more stringer body plies and laminating the one or more frame filler inner plies respectively includes:
laminating, using the at least one stringer body lamination head, the stringer body plies such that at least one of opposing stringer body side edges is formed as a beveled edge; and
laminating, using the frame filler inner ply lamination head, the frame filler inner plies at each frame filler location to define a bevel angle that is complementary to the beveled edge of the stringer body.

20. The method of claim 12, further comprising:
applying, using at least one processing material lamination head, processing material onto at least one of the lamination surface and the stringer laminate; and
the processing material including at least one of the following: an adhesive material, a protective material, and a release material.

21. A method of laying up a stringer laminate, comprising steps of:
laminating a plurality of frame filler bottom plies at spaced intervals along a lamination surface to define a plurality of frame filler locations;
laminating at least one frame filler inner ply over a protruding portion of one or more of the frame filler bottom plies such that an overlapping portion of at least one of the frame filler bottom plies is non-covered by the frame filler inner ply;
laminating at least one stringer body ply to define a stringer body portion extending along the lamination surface and overlapping the overlapping portion at one or more of the frame filler locations; and
laminating a frame filler top ply over the at least one frame filler inner ply at one or more of the frame filler location such that the at least one frame filler inner ply at at least one of the frame filler locations is captured between a frame filler bottom ply and a frame filler top ply; and
wherein the steps of laminating the frame filler bottom plies, laminating the frame filler inner plies, laminating the stringer body plies, and laminating the frame filler top plies are performed in single pass by a plurality of lamination heads positioned in end-to-end relation to each other along a common dispensing direction.

\* \* \* \* \*